United States Patent
Arimura et al.

(10) Patent No.: US 11,022,904 B2
(45) Date of Patent: Jun. 1, 2021

(54) ELECTROPHOTOGRAPHIC MEMBER, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Hideya Arimura, Shizuoka (JP); Masaki Yamada, Numazu (JP); Hiroaki Komatsu, Fuji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 16/516,763

(22) Filed: Jul. 19, 2019

(65) Prior Publication Data

US 2020/0041920 A1 Feb. 6, 2020

(30) Foreign Application Priority Data

Jul. 31, 2018 (JP) .............................. JP2018-144210

(51) Int. Cl.
| | |
|---|---|
| *G03G 5/10* | (2006.01) |
| *G03G 15/00* | (2006.01) |
| *G03G 21/18* | (2006.01) |
| *C08K 5/3445* | (2006.01) |

(52) U.S. Cl.
CPC ............. *G03G 5/10* (2013.01); *C08K 5/3445* (2013.01); *G03G 5/105* (2013.01); *G03G 15/75* (2013.01); *G03G 21/1814* (2013.01)

(58) Field of Classification Search
CPC .......... G03G 5/10; G03G 5/105; G03G 5/104; G03G 15/75; G03G 15/0233; G03G 15/0818; G03G 15/0808; G03G 21/1814; G03G 21/0058; C08K 5/3445
See application file for complete search history.

(56) References Cited

U.S. PATENT DOCUMENTS

| | | | |
|---|---|---|---|
| 7,797,833 B2 | 9/2010 | Nakamura et al. | |
| 7,799,398 B2 | 9/2010 | Nakamura et al. | |
| 8,600,273 B2 | 12/2013 | Yamada et al. | |
| 8,655,222 B2 | 2/2014 | Nakamura et al. | |
| 8,706,011 B2 | 4/2014 | Anan et al. | |
| 8,768,226 B2 | 7/2014 | Koyanagi et al. | |
| 8,768,227 B2 | 7/2014 | Urushihara et al. | |
| 8,774,677 B2 | 7/2014 | Sakurai et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,874,007 B2 | 10/2014 | Kawamura et al. | |
| 8,874,012 B2 | 10/2014 | Yamada et al. | |
| 8,913,930 B2 | 12/2014 | Ishii et al. | |
| 9,581,931 B2 | 2/2017 | Yamada et al. | |
| 9,599,913 B2 | 3/2017 | Nishioka et al. | |
| 9,639,009 B2 | 5/2017 | Yamaguchi et al. | |
| 9,665,028 B2 | 5/2017 | Arimura et al. | |
| 9,811,009 B2 | 11/2017 | Yamada et al. | |
| 9,964,914 B2 | 5/2018 | Arimura et al. | |
| 9,977,353 B2 | 5/2018 | Nishioka et al. | |
| 9,977,359 B2 | 5/2018 | Koyanagi et al. | |
| 10,018,934 B2 | 7/2018 | Yamada et al. | |
| 10,108,129 B2 | 10/2018 | Yamaguchi et al. | |
| 10,197,930 B2 | 2/2019 | Yamada et al. | |
| 10,303,079 B2 | 5/2019 | Utsuno et al. | |
| 10,331,054 B2 | 6/2019 | Urushihara et al. | |
| 10,379,460 B2 | 8/2019 | Arimura et al. | |
| 2012/0263499 A1 | 10/2012 | Yamauchi et al. | |
| 2015/0105560 A1* | 4/2015 | Berny ................ | H01L 51/0072 548/156 |
| 2015/0331342 A1 | 11/2015 | Yamaguchi et al. | |
| 2015/0331346 A1 | 11/2015 | Yamauchi et al. | |
| 2016/0363881 A1 | 12/2016 | Urushihara et al. | |
| 2019/0094741 A1 | 3/2019 | Uno et al. | |
| 2019/0302644 A1 | 10/2019 | Yamada et al. | |

FOREIGN PATENT DOCUMENTS

| | | |
|---|---|---|
| JP | 2003-202722 | 7/2003 |
| JP | 2010-229401 | 10/2010 |
| JP | 2015-222436 | 12/2015 |
| JP | 2016-085268 | 5/2016 |

OTHER PUBLICATIONS

U.S. Appl. No. 16/378,939, Hideya Arimura, filed Apr. 9, 2019.
U.S. Appl. No. 16/522,067, Hiroaki Komatsu, filed Jul. 25, 2019.

* cited by examiner

*Primary Examiner* — Robert S Jones, Jr.
(74) *Attorney, Agent, or Firm* — Venable LLP

(57) ABSTRACT

Provided an electrophotographic member having an excellent electroconductivity and being capable of forming a high quality electrophotographic image even in long-term use. The electrophotographic member comprises an electroconductive substrate and an electroconductive layer on the substrate, the electroconductive layer containing a matrix polymer, and a specific imidazolium salt.

15 Claims, 8 Drawing Sheets

ELECTROPHOTOGRAPHIC MEMBER, PROCESS CARTRIDGE AND ELECTROPHOTOGRAPHIC IMAGE FORMING APPARATUS

BACKGROUND

The present disclosure relates to an electrophotographic member, which is used in an electrophotographic image forming apparatus, and a process cartridge and the electrophotographic image forming apparatus which have the electrophotographic member.

DESCRIPTION OF THE RELATED ART

The electrophotographic member is used in various applications, for example, as a developer-carrying body (hereinafter referred to as "developing roller"), a transfer roller, a charging roller, a cleaning blade, a developing blade and a toner supplying roller. As for such an electrophotographic member, it is preferable that an electrical resistance value is in a range of $1.0 \times 10^3$ to $1.0 \times 10^{10}$ Ωcm without being affected by a surrounding environment. Furthermore, it is preferable that a resistance value of the electrophotographic member is uniform over the entire member and is stable over time.

Japanese Patent Application Laid-Open No. 2016-85268 discloses an electroconductive roller in which a urethane coating layer is formed on an outer circumferential surface of an elastic layer, which contains: a urethane resin that acts as a binder resin; at least one ionic liquid selected from the group consisting of a pyridinium-based ionic liquid, an amine-based ionic liquid and an imidazolium-based ionic liquid; and a urethane resin particle.

SUMMARY

One aspect of the present disclosure is directed to providing an electrophotographic member, which has excellent electroconductivity and can form a high quality electrophotographic image even in long-term use. In addition, another aspect of the present disclosure is directed to providing a process cartridge that contributes to stable formation of a high quality electrophotographic image. Furthermore, another aspect of the present disclosure is directed to providing an electrophotographic image forming apparatus that can stably form the high quality electrophotographic image.

According to one aspect of the present disclosure, there is provided an electrophotographic member, which includes an electroconductive substrate and an electroconductive layer on the substrate, wherein the electroconductive layer includes a matrix polymer and an imidazolium salt represented by the following Structural Formula (1) or Structural Formula (2):

Structural Formula (1)

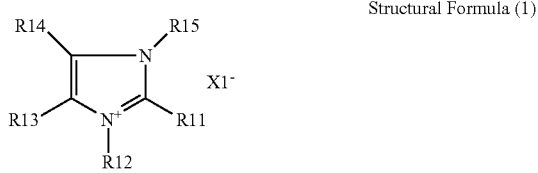

wherein R11, R13 and R14 each independently represent a hydrogen atom or a saturated hydrocarbon group having 1 to 4 carbon atoms, R12 and R15 each independently represent a saturated hydrocarbon group having 8 to 20 carbon atoms, and X1⁻ represents an anion, provided that at least one of R12 and R15 represents a saturated hydrocarbon group having 9 to 20 carbon atoms:

Structural Formula (2)

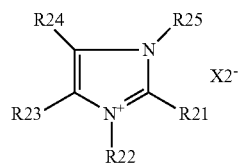

wherein R21, R22 and R25 each independently represent a hydrogen atom or a saturated hydrocarbon group having 1 to 4 carbon atoms, R23 and R24 each independently represent a saturated hydrocarbon group having 8 to 20 carbon atoms, and X2⁻ represents an anion, provided that at least one of R23 and R24 represents a saturated hydrocarbon group having 9 to 20 carbon atoms.

In addition, according to another aspect of the present disclosure, there is provided a process cartridge that is configured to be detachably attached to a main body of an electrophotographic image forming apparatus, and has an electrophotographic member, which is at least one selected from the group consisting of a charging member, a developing member and a cleaning member, wherein the electrophotographic member is the above described electrophotographic member.

Furthermore, according to another aspect of the present disclosure, there is provided an electrophotographic image forming apparatus that has an electrophotographic member, which is at least one selected from the group consisting of a charging member, a developing member, and a cleaning member, wherein the electrophotographic member is the above described electrophotographic member.

Further features of the present disclosure will become apparent from the following description of exemplary embodiments with reference to the attached drawings.

DESCRIPTION OF THE EMBODIMENTS

Figure 1C:
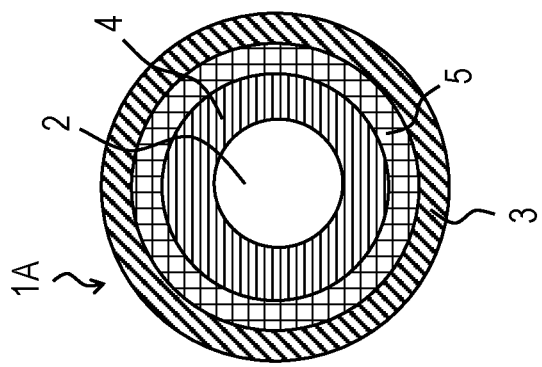
FIGS. 1A, 1B and 1C illustrate schematic cross-sectional views of a roller for electrophotography according to one embodiment of the present disclosure.

Preferred embodiments of the present disclosure will now be described in detail in accordance with the accompanying drawings.

The present inventors have examined a developing blade provided with a urethane coating layer according to Japanese Patent Application Laid-Open No. 2016-85268 formed on the surface. As a result, it has been confirmed that the developing blade exhibits adequate electroconductivity. However, when solid white images, for example, have been continuously output under an environment at a temperature of 30° C. with the use of an electrophotographic image forming apparatus equipped with this developing blade, there has been the case where a toner has adhered to the paper and fogging has occurred.

The present inventors have examined the reason why the fogging has occurred in the solid white image formed with the use of the electrophotographic image forming apparatus equipped with the developing blade which is provided with the urethane coating layer according to Japanese Patent Application Laid-Open No. 2016-85268. As a result, it has been found that a surface of the developing blade in the electrophotographic image forming apparatus has been abraded by long-term use, and a capability to regulate a layer thickness of a developer on a developing roller has lowered. Also, the present inventors have assumed the reason why the developing blade has been abraded by long-term use as follows.

An ionic liquid has high polarity. On the other hand, a urethane resin which is a matrix polymer has relatively low polarity compared to the ionic liquid. Because of this, in the urethane coating layer, the ionic liquids flocculate with each other. In addition, a strength of the flocculating portion of the ionic liquid in the urethane coating layer is low compared to that of the urethane resin portion. Because of this, it is considered that the urethane coating layer is gradually abraded by the long-term use.

For this reason, the inventors of the present disclosure have made an investigation, and as a result, have found that an electroconductive layer containing a matrix polymer and an imidazolium salt which is represented by the following Structural Formula (1) or Structural Formula (2) has high electroconductivity, and is also excellent in abrasion resistance.

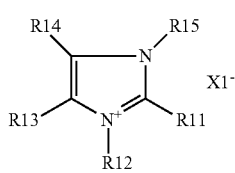

Structural Formula (1)

In Structural Formula (1), R11, R13 and R14 each independently represent a hydrogen atom or a saturated hydrocarbon group having 1 to 4 carbon atoms, R12 and R15 each independently represent a saturated hydrocarbon group having 8 to 20 carbon atoms, and X1$^-$ represents an anion, provided that at least one of R12 and R15 represents a saturated hydrocarbon group having 9 to 20 carbon atoms.

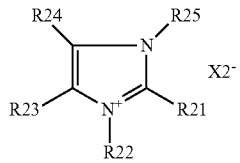

Structural Formula (2)

In Structural Formula (2), R21, R22 and R25 each independently represent a hydrogen atom or a saturated hydrocarbon group having 1 to 4 carbon atoms, R23 and R24 each independently represent a saturated hydrocarbon group having 8 to 20 carbon atoms, and X2$^-$ represents an anion, provided that at least one of R23 and R24 represents a saturated hydrocarbon group having 9 to 20 carbon atoms.

The present inventors assume the reason why the above described electroconductive layer shows the high electroconductivity and excellent abrasion resistance as follows.

Figure 3:
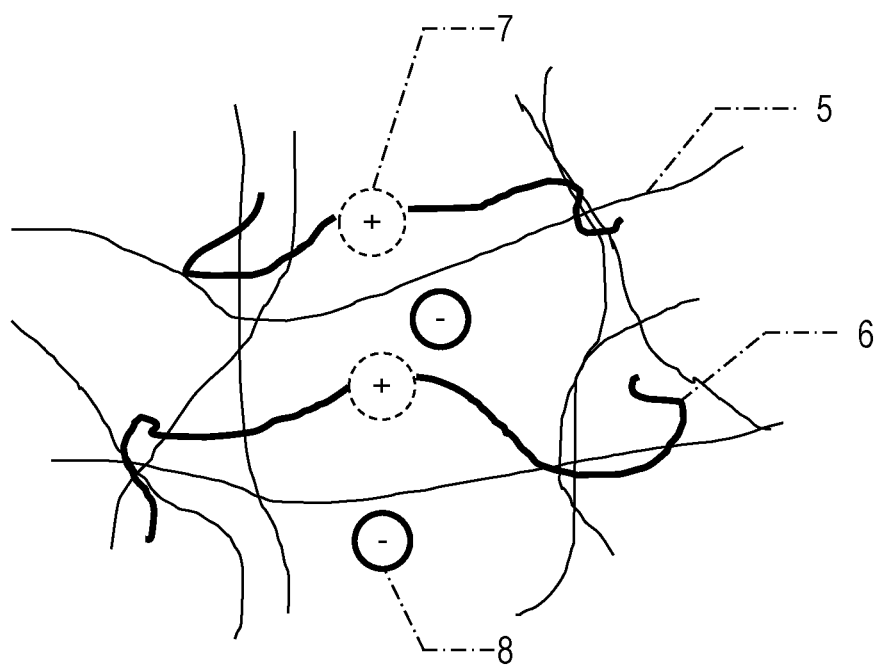
FIG. 3 is a conceptual view illustrating the entanglement of an imidazolium salt and a matrix polymer of the present disclosure.

In the imidazolium salts represented by Structural Formula (1) and Structural Formula (2), a saturated hydrocarbon group having 9 to 20 carbon atoms is bonded to at least one of two nitrogen atoms or carbon atoms in an imidazolium ring. In addition, as is illustrated in FIG. 3, a saturated hydrocarbon group 6 having 9 to 20 carbon atoms, which bonds to the imidazolium ring 7, is entangled with a polymer chain 5 of the matrix polymer to form a pseudo cross-linking point. It is considered that the formation of the pseudo cross-linking point can enhance the abrasion resistance of the electroconductive layer.

In addition, the imidazolium does not form a chemical bond with the matrix polymer, and accordingly a mobility of an anion 8 which is a carrier also resists being reduced. Because of this, it is considered that the high electroconductivity is also maintained. Thus assumed mechanism is considered to be correct, also because when the number of carbon atoms of the saturated hydrocarbon group bonded to two nitrogen atoms or carbon atoms in the imidazolium ring has been 7 or less, remarkable enhancement in the abrasion resistance has not been found.

On the other hand, when a saturated hydrocarbon group having 21 or more carbon atoms has been bonded to two nitrogen atoms or carbon atoms in the imidazolium ring, the effect of enhancing the abrasion resistance has not been obtained. This is considered to be because the saturated hydrocarbon groups become easily entangled with each other as a result that the saturated hydrocarbon group has become long, and it has become difficult for the saturated hydrocarbon group to be entangled with the polymer chain of the matrix polymer. In addition, it is considered that when the number of carbon atoms of the saturated hydrocarbon group to be bonded to at least one of two nitrogen atoms or carbon atoms in the imidazolium ring has been controlled to 9 or more and 20 or less, the saturated hydrocarbon group can be efficiently entangled with the polymer chains of the matrix polymer while preventing their mutual entanglement.

<Electrophotographic Member>

An electrophotographic member according to one embodiment of the present disclosure has an electroconductive substrate and an electroconductive layer on the substrate. In the present disclosure, the electrophotographic member refers to: an electroconductive roller such as a developing roller, a transfer roller, a charging roller and a toner supplying roller; a developing blade; and a cleaning blade.

Figure 1B:
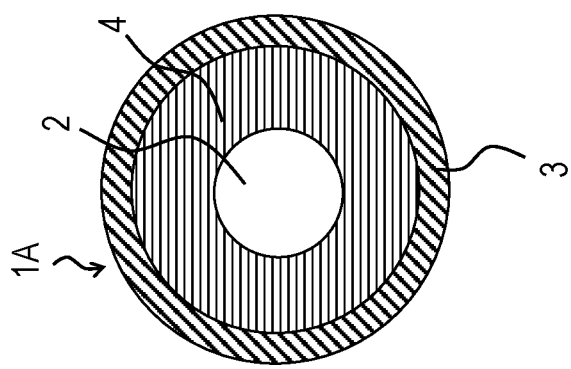
Figure 1A:
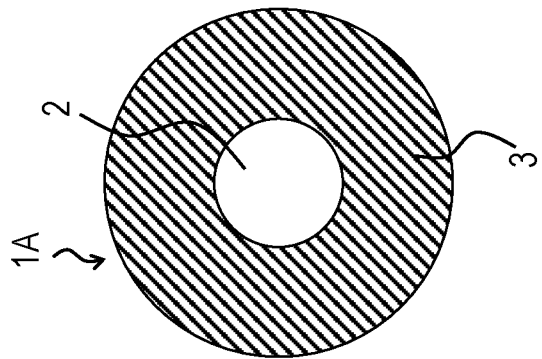

As one example of the electrophotographic member, an electrophotographic member having a roller shape (roller for electrophotography) is illustrated in FIGS. 1A to 1C. The roller for electrophotography 1A illustrated in FIG. 1A includes the electroconductive substrate 2 and the electroconductive layer 3 on the substrate. As is illustrated in FIG. 1B, an elastic layer 4 may be further provided between the substrate 2 and the electroconductive layer 3. The roller for electrophotography 1A may have a three-layer structure in which an intermediate layer 5 is arranged between the elastic layer 4 and the electroconductive layer 3 as illustrated in FIG. 1C, or may have a multi-layered structure in which a plurality of intermediate layers 5 are arranged.

In order that the roller for electrophotography 1A more effectively shows an effect according to one embodiment of the present disclosure, it is preferable that the electroconductive layer 3 exists as the outermost layer of the roller for electrophotography 1A, as is illustrated in FIGS. 1A to 1C. In addition, it is preferable that the roller for electrophotography 1A includes the elastic layer 4. The outermost electroconductive layer 3 contains a matrix polymer and an imidazolium salt having a specific structure.

Figure 2A:
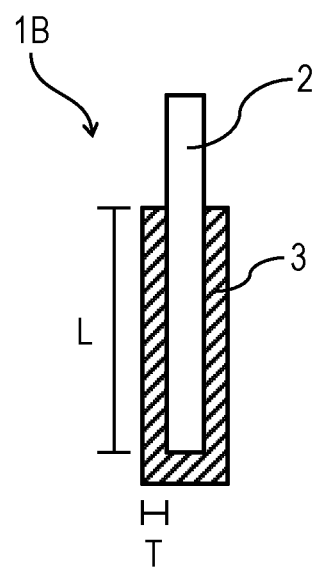
FIGS. 2A and 2B illustrate schematic cross-sectional views of a blade for electrophotography according to one embodiment of the present disclosure.
Figure 2B:
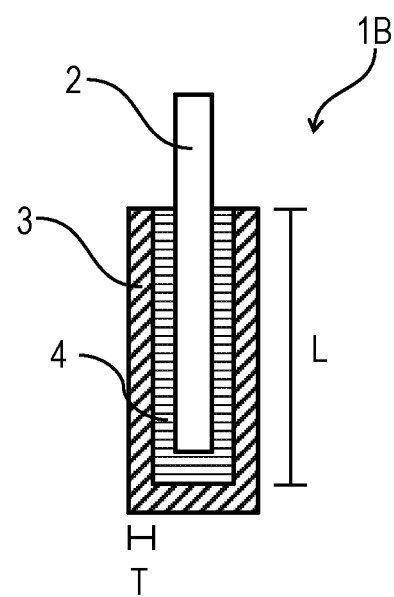

In addition, another example of the electrophotographic member includes an electrophotographic member having a blade shape (blade for electrophotography). FIGS. 2A and 2B are schematic cross-sectional views of the blade for electrophotography 1B. The blade for electrophotography 1B illustrated in FIG. 2A includes the electroconductive substrate 2 and the electroconductive layer 3 on the substrate. In the electrophotographic blade 1B illustrated in FIG. 2B, the elastic layer 4 is further provided between the substrate 2 and the electroconductive layer 3.

A configuration of the electrophotographic member according to one embodiment of the present disclosure will be described below in detail.

[Substrate]

The substrate 2 functions as a support member of the electrophotographic member, and as an electrode in some cases. The substrate 2 is formed from an electroconductive material, for example, a metal such as aluminum and copper; an alloy such as stainless steel; iron which is plated with chromium or nickel; and a synthetic resin having electroconductivity. When the electrophotographic member is blade-shaped, the substrate 2 is plate-shaped, and when the electrophotographic member is roller-shaped, the substrate 2 is solid column-shaped or a hollow cylinder-shaped.

[Elastic Layer]

The elastic layer 4 imparts the elasticity to the electrophotographic member, which is necessary for forming a nip having a predetermined width in a contact part with a member that is brought into contact with the electrophotographic member, particularly, in the case where the electrophotographic member is roller-shaped.

It is preferable that the elastic layer 4 is a molded body of a rubber material. Examples of the rubber material include the following rubber materials: an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydroxide of the NBR, and an urethane rubber. These materials can be used alone or in combination with other one or more types. Among these, the silicone rubber is preferable from the viewpoint of compression set and flexibility. Examples of the silicone rubber include polydimethylsiloxane, polytrifluoropropylsiloxane, polymethylvinylsiloxane, polyphenylvinylsiloxane, and copolymers of these polysiloxanes.

Examples of a method of forming the elastic layer 4 include a method of molding a liquid rubber material, and a method of extruding a kneaded rubber material. It is preferable that a thickness of the elastic layer is 0.3 mm or larger and 10.0 mm or smaller.

With the elastic layer 4, an electroconductivity imparting agent is appropriately blended, in order to impart the electroconductivity. Usable electroconductivity imparting agents include fine particles of: carbon black; electroconductive metals such as aluminum and copper; and electroconductive metal oxides such as zinc oxide, tin oxide and titanium oxide. Among these, carbon black is preferable, from the viewpoint of being relatively easily available and providing adequate electroconductivity. When the carbon black is used as the electroconductivity imparting agent, it is preferable to blend 2 to 50 parts by mass of carbon black with 100 parts by mass of the above described rubber material.

In the elastic layer 4, various additives such as a non-electroconductive filler, a cross-linking agent and a catalyst may be appropriately blended. The non-electroconductive filler includes silica, quartz powder, titanium oxide, zinc oxide or calcium carbonate. The cross-linking agent is not limited in particular, but includes, for example, tetraethoxysilane, di-t-butyl peroxide, 2,5-dimethyl-2,5-di(t-butylperoxy)hexane and dicumyl peroxide.

[Electroconductive Layer]

A composition of the electroconductive layer 3 in one embodiment of the electrophotographic member will be described below in detail.

The electroconductive layer positioned in the outermost layer contains a matrix polymer, and an imidazolium salt represented by the following Structural Formula (1) or Structural Formula (2) as an ion conductive agent.

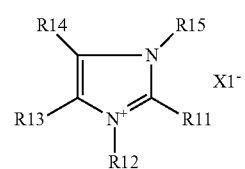

Structural Formula (1)

In Structural Formula (1), R11, R13 and R14 each independently represent a hydrogen atom or a saturated hydrocarbon group having 1 to 4 carbon atoms, R12 and R15 each independently represent a saturated hydrocarbon group having 8 to 20 carbon atoms, and $X1^-$ represents an anion, provided that at least one of R12 and R15 represents a saturated hydrocarbon group having 9 to 20 carbon atoms.

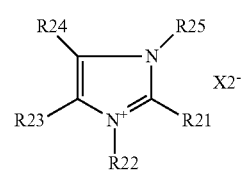

Structural Formula (2)

In Structural Formula (2), R21, R22 and R25 each independently represent a hydrogen atom or a saturated hydrocarbon group having 1 to 4 carbon atoms, R23 and R24 each independently represent a saturated hydrocarbon group having 8 to 20 carbon atoms, and X2⁻ represents an anion, provided that at least one of R23 and R24 represents a saturated hydrocarbon group having 9 to 20 carbon atoms.

[Imidazolium Salt]

The imidazolium salt represented by Structural Formula (1) or Structural Formula (2) has an imidazolium cation and an anion.

(Imidazolium Cation)

In Structural Formula (1), R11, R13 and R14 each independently represent a hydrogen atom or a saturated hydrocarbon group having 1 to 4 carbon atoms. The saturated hydrocarbon groups having 1 to 4 carbon atoms include a methyl group, an ethyl group, a propyl group and a butyl group. The saturated hydrocarbon group may be linear or branched.

In Structural Formula (1), R12 and R15 each independently represent a saturated hydrocarbon group having 8 to 20 carbon atoms, provided that at least one of R12 and R15 represents a saturated hydrocarbon group having 9 to 20 carbon atoms. As the saturated hydrocarbon group having 9 to 20 carbon atoms, it is preferable for the saturated hydrocarbon group to be a linear saturated hydrocarbon group, particularly from the viewpoint of efficient formation of entanglement with the polymer chain of the matrix polymer. In addition, in the case of the branched saturated hydrocarbon group, it is preferable that the branched saturated hydrocarbon group has such a saturated hydrocarbon group chain as to have a linear portion having 8 to 19 carbon atoms.

The saturated hydrocarbon groups having 8 to 20 carbon atoms include an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an icosyl group. The saturated hydrocarbon group may be linear or branched. The branched saturated hydrocarbon groups include a 1-methylundecyl group, a 2-ethyldodecyl group and a 2-methyltridecyl group.

In Structural Formula (2), R21, R22 and R25 each independently represent a hydrogen atom or a saturated hydrocarbon group having 1 to 4 carbon atoms. The saturated hydrocarbon groups having 1 to 4 carbon atoms include a methyl group, an ethyl group, a propyl group and a butyl group. The saturated hydrocarbon group may be linear or branched.

In Structural Formula (2), R23 and R24 each independently represent a saturated hydrocarbon group having 8 to 20 carbon atoms, provided that at least one of R23 and R24 represents a saturated hydrocarbon group having 9 to 20 carbon atoms. The saturated hydrocarbon groups having 8 to 20 carbon atoms include an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an icosyl group. The saturated hydrocarbon group may be linear or branched. The branched saturated hydrocarbon groups include a 1-methylundecyl group, a 2-ethyldodecyl group and a 2-methyltridecyl group.

In addition, it is preferable that a difference between the number of carbon atoms of the saturated hydrocarbon group represented by R12 and the number of carbon atoms of the saturated hydrocarbon group represented by R15 in Structural Formula (1) is 0 or more and 2 or less, from the viewpoint of an interaction between imidazolium salts which have been entangled with the polymer chains of the matrix polymer. Here, when at least one of R12 and R15 is a branched saturated hydrocarbon group, the above described difference between the numbers of carbon atoms is calculated based on the number of carbon atoms of the longest saturated hydrocarbon chain in the branched saturated hydrocarbon group.

In Structural Formula (2), it is preferable that the difference between the saturated hydrocarbon group represented by R23 and the number of carbon atoms of the saturated hydrocarbon group represented by R24 is 0 or more and 2 or less. Similarly to the above description, when at least one of R23 and R24 is a branched saturated hydrocarbon group, the above described difference between the numbers of carbon atoms is calculated based on the number of carbon atoms of the longest saturated hydrocarbon chain in the branched saturated hydrocarbon group.

As the saturated hydrocarbon group having 9 to 20 carbon atoms for R12, R15, R23 and R24, it is preferable that the saturated hydrocarbon group is linear structure as represented by the following Structural Formulae (3) and (4), from the viewpoint of ease of entanglement with the matrix polymer and the interaction between the imidazolium salts in an entangled state.

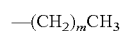
—(CH₂)ₘCH₃                    Structural Formula (3)

In Structural Formula (3), m represents an integer of 8 to 19.

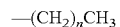
—(CH₂)ₙCH₃                    Structural Formula (4)

In Structural Formula (4), n represents an integer of 8 to 19.

Furthermore, when the saturated hydrocarbon groups represented by R12 and R15 and/or R23 and R24 are the same, crystallinity is exhibited in the imidazolium salt, and furthermore, abrasion resistance can be enhanced, which are preferable.

Examples of an imidazolium cation which gives Structural Formula (1) include the following: a 1,3-dinonylimidazolium cation, a 1,3-didecylimidazolium cation, a 1,3-diundecylimidazolium cation, a 1,3-didodecylimidazolium cation, a 1,3-ditridecylimidazolium cation, a 1,3-ditetradecylimidazolium cation, a 1,3-dipentadecylimidazolium cation, a 1,3-dihexadecylimidazolium cation, a 1,3-diheptadecylimidazolium cation, a 1,3-dioctadecylimidazolium cation, a 1,3-dinonadecylimidazolium cation, a 1,3-diicosylimidazolium cation, a 3-heptadecyl-1-icosylimidazolium cation, a 1-icosyl-3-nonadecylimidazolium cation, a 3-decyl-1-dodecylimidazolium cation, a 1-nonyl-3-octadecylimidazolium cation, a 2-methyl-1,3-dinonylimidazolium cation, a 1,3-didecyl-2-methylimidazolium cation, a 1-dodecyl-3-tridecylimidazolium cation, a 3-decyl-1-dodecylimidazolium cation, a 1-decyl-3-(2-ethyl)dodecylimidazolium cation, a 1-(2-methyl)tridecyl-3-tridecylimidazolium cation, and derivatives thereof.

Examples of an imidazolium cation which gives Structural Formula (2) include the following: a 4,5-dinonylimidazolium cation, a 4,5-didecylimidazolium cation, a 4,5-diundecylimidazolium cation, a 4,5-didodecylimidazolium cation, a 4,5-ditridecylimidazolium cation, a 4,5-ditetradecylimidazolium cation, a 4,5-dipentadecylimidazolium cation, a 4,5-dihexadecylimidazolium cation, a 4,5-diheptadecylimidazolium cation, a 4,5-dioctadecylimidazolium cation, a 4,5-dinonadecylimidazolium cation, a 4,5-diicosyl imidazolium cation, a 5-decyl-4-octylimidazolium cation, a 5-dodecyl-4-undecylimidazolium cation, a 5-heptadecyl-4-icosylimidazolium cation, a 4-icosyl-5-nonadecylimidazolium cation, a 5-nonadecyl-4-octylimidazolium cation, a 5-decyl-4-dodecylimidazolium cation, a 4-decyl-5-(1-methyl)undecylimidazolium cation, a 4,5-didecyl-2-methylimidazolium cation, a 2-methyl-4,5-diundecylimidazolium cation, a 4-(2-methyl)tridecyl-5-tridecylimidazolium cation, a 1,3-dimethyl-4,5-diundecylimidazolium cation, and derivatives thereof (Anion)

Examples of the anions represented by $X1^-$ and $X2^-$ in Structural Formula (1) and Structural Formula (2) include the following: a fluoroalkylsulfonylimide anion, a fluorosulfonylimide anion, a fluoroalkyl sulfonate anion, a fluoroalkyl carboxylate anion, a fluoroborate anion, a dicyanamide anion, a bisoxalatoborate anion, a thiocyanate anion, a fluorophosphate anion, a fluoroalkyl methide anion, and derivatives thereof.

The fluoroalkylsulfonylimide anions specifically include: fluoroalkylsulfonylimide anions having a fluoroalkyl group having 1 to 6 carbon atoms such as a bis(trifluoromethanesulfonyl)imide anion, a bis(pentafluoroethanesulfonyl)imide anion, a bis(heptafluoropropanesulfonyl)imide anion, a bis(nonafluorobutanesulfonyl)imide anion, a bis(dodecafluoropentanesulfonyl)imide anion, and a bis(perfluorohexanesulfonylimide) anion; and cyclic fluoroalkylsulfonylimide anions such as an N,N-hexafluoropropane-1,3-disulfonylimide.

The fluorosulfonylimide anions specifically include a bis(fluorosulfonyl)imide anion.

The fluoroalkyl sulfonate anions specifically include a trifluoromethanesulfonic acid anion, a perfluoroethanesulfonic acid anion and a perfluorobutanesulfonic acid anion.

Among these anions, the fluoroalkylsulfonylimide anion, the fluoroalkyl sulfonate anion, the fluorosulfonylimide anion, the fluoroborate anion, the dicyanamide anion and the thiocyanate anion are preferable, from the viewpoint of enhancing the electroconductivity. In particular, the fluoroalkylsulfonylimide anion, the fluoroalkyl sulfonate anion, the fluorosulfonylimide anion and the dicyanamide anion are more preferable.

[Matrix Polymer]

The matrix polymers include a polyamide resin, a polyurethane resin, a polyester resin, an acrylic resin, an epoxy resin, a polyolefin resin, a polystyrene resin, and further copolymers thereof. It is preferable that the matrix polymer is at least one resin selected from the group consisting of the polyamide resin, the polyurethane resin, the polyester resin and the acrylic resin, from the viewpoint of a film strength and a toner chargeability.

The polyamide resin, the polyurethane resin, the polyester resin and the acrylic resin are suitably used as the matrix polymer, also because of having both of flexibility and rebound resilience. It is preferable that the weight average molecular weight (Mw) of the matrix polymer is 10000 to 200000, in view of the ease with which the matrix polymer is mixed with the imidazolium salt.

The polyamide resin refers to all resins having a polyamide skeleton, and known resins can be used. Examples of the polyamide resin include Nylon 6, Nylon-6,6, Nylon 11, Nylon 12, a polyetheramide copolymer, a polyester block amide copolymer and a polyether ester amide copolymer. In addition, a commercialized product can be also used as the polyamide resin. The commercially available polyamide resins include "Pevax MV1074" and "Pevax MH1657" (all trade names, and made by Arkema K.K), and "UBESTA XPA 9048", "UBESTA XPA 9055", "UBESTA XPA 9040" and "UBESTA XPA9063" (all trade names, and made by Ube Industries, Ltd.).

The polyurethane resin is obtained by a reaction between a known polyol component and an isocyanate compound. The polyol components which are used as a raw material of the polyurethane resin include a polyether polyol, a polyester polyol, a polycarbonate polyol, a polyolefin polyol and an acrylic polyol. Among the polyol components, the polyether polyol, the polyester polyol or the polycarbonate polyol are preferable, from the viewpoint of self-reinforcement and compatibility with the ion conductive agent. In addition, urethane prepolymer polyols are also acceptable which are obtained by reacting the above polyols with isocyanate.

The polyether polyols include polyethylene glycol, polypropylene glycol and polytetramethylene glycol.

In addition, the polyether polyols include the following: polyester polyols that are obtained by a condensation reaction of a diol component such as 1,4-butanediol, 3-methyl-1,4-pentanediol and neopentyl glycol, or a triol component such as trimethylolpropane, with a dicarboxylic acid such as adipic acid, phthalic anhydride, terephthalic acid and hexahydroxyphthalic acid.

In addition, the polycarbonate polyols include the following: polycarbonate polyols that are obtained by a condensation reaction of a diol component such as 1,3-propanediol, 1,4-butanediol, 1,6-hexanediol, 3-methyl-1,5-pentanediol, diethylene glycol, polyethylene glycol, polypropylene glycol and polytetramethylene glycol, with a dialkyl carbonate such as phosgene and dimethyl carbonate, or a cyclic carbonate such as ethylene carbonate.

The isocyanate compound is not limited in particular, and the followings can be employed: aliphatic polyisocyanates such as ethylene diisocyanate and 1,6-hexamethylene diisocyanate (HDI); cycloaliphatic polyisocyanates such as isophorone diisocyanate (IPDI), cyclohexane-1,3-diisocyanate and cyclohexane-1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate; and copolymers, isocyanurate bodies, TMP adduct bodies, biuret bodies thereof, and their block bodies.

Among the isocyanate compounds, the aromatic isocyanates such as the tolylene diisocyanate, the diphenylmethane diisocyanate and the polymeric diphenylmethane diisocyanate are preferable.

It is preferable to mix the polyol component and the isocyanate compound so that a ratio (molar ratio) of an isocyanate group in the isocyanate compound becomes in a range of 1.0 or larger and 2.0 or smaller, with respect to 1.0 of a hydroxyl group in the polyol component. If the mixing ratio is within the above described range, an amount of remaining unreacted components can be reduced.

The polyester resin is obtained, for example, by a polycondensation of a dicarboxylic acid and a dialcohol. The dicarboxylic acids include terephthalic acid and 2,6-naphthalene dicarboxylic acid. In addition, the dialcohols include ethylene glycol, 1,3-propanediol, 1,4-butanediol and 1,4-cyclohexanedimethanol. A commercialized product can also be used as the polyester resin. Examples of the commercially available polyester resins include "Hytrel 4057N", "Hytrel SB654", "Hytrel SB704" and "Hytrel 4001T-X04" (all trade names, and made by DU PONT-TORAY CO., LTD.).

The acrylic resin is obtained by a polymerization of a (meth)acrylic monomer. The (meth)acrylic monomers include methyl (meth)acrylate, ethyl (meth)acrylate, t-butyl (meth)acrylate, isobutyl (meth)acrylate, n-butyl (meth)acrylate, n-hexyl(meth)acrylate, n-octyl (meth)acrylate and n-lauryl (meth)acrylate. For information, when the (meth) acrylate is written, the (meth)acrylate shall mean acrylate and/or methacrylate. In addition, separately from the (meth) acrylate, another vinyl copolymer may be concomitantly used. Other vinyl copolymers include vinyl cyanides, vinyl esters, aromatic vinyl compounds, derivatives of unsaturated polyvalent carboxylic acids, dienes, heterocyclic vinyl monomers, vinyl alkyl ethers, and olefins.

It is preferable that a content of the above described imidazolium salt with respect to the matrix polymer is 1 part by mass or more and 40 parts by mass or less with respect to 100 parts by mass of the matrix polymer. Furthermore, it is more preferable that the content of the above described imidazolium salt is 3 parts by mass or more and 20 parts by mass or less with respect to 100 parts by mass of the matrix polymer, from the viewpoint of the abrasion resistance and low compressive strain characteristics.

Incidentally, the structure and the content of the imidazolium salt can be checked by an operation of taking out only the electroconductive layer from the electrophotographic member, and extracting the imidazolium salt by a general extraction method, for example, such as a Soxhlet extraction method.

Solvent to be used for the extraction include methanol, ethanol, methyl ethyl ketone, methyl isobutyl ketone, pure water, acetone, tetrahydrofuran, dimethyl sulfoxide and dimethyl formamide. An extracted component can be analyzed by an arbitrary method such as GC/MS or LC/MS. At the time of the extraction, in order to check that the imidazolium salt has been sufficiently extracted, the second extraction operation is definitely performed on the electroconductive layer which has been subjected to the extraction operation once; and the extraction operation is performed under the condition that the second amount of extracted imidazolium salt becomes 1% or less with respect to the first amount of extracted imidazolium salt. Incidentally, the conditions of the Soxhlet extraction refer to a solvent type, a temperature and a time period. In addition, as for the solvent, a solvent is selected from among the above described solvents, which has extracted the largest amount of the imidazolium salt. The sum of the amount of the detected component which has been obtained by the first extraction operation and the amount of the detected component which has been obtained by the second extraction operation is determined to be the content of the imidazolium salt.

In addition, the content of the matrix polymer can be measured in the following way. An arbitrary solvent, for example, such as m-cresol and pyridine is employed, and an electroconductive layer after the above described extraction operation is dissolved thereinto. After that, an insoluble matter such as a filler matter is removed by an operation such as centrifugation or filtration; then the solvent is dried; and the content of the matrix polymer is measured which is contained in the collected electroconductive layer.

The electroconductive layer may contain a non-electroconductive filler such as silica, a quartz powder, titanium oxide, zinc oxide and calcium carbonate, as needed. These non-electroconductive fillers exhibit a function of a film-forming aid by being added to a paint for forming the electroconductive layer, when the paint is coated in a step of forming the electroconductive layer. It is preferable that the content of such a non-electroconductive filler is 1 part by mass or more to 30 parts by mass or less with respect to 100 parts by mass of the resin which forms the electroconductive layer. Here, the "resin which forms the electroconductive layer" means a matrix of the electroconductive layer that includes a complex which has been formed by pseudo cross-linking of the matrix polymer and the imidazolium salt.

In addition, the electroconductive layer may contain an electroconductive filler, as needed, in such a range as not to impair the effects of the present disclosure. Usable electroconductive fillers include: carbon black; an electroconductive metal such as aluminum and copper; and a fine particle of an electroconductive metal oxide such as zinc oxide, tin oxide and titanium oxide. Among the electroconductive fillers, the carbon black is particularly preferably used, because of being relatively easily available and having high electroconductivity imparting properties and reinforcing properties.

When a certain degree of surface roughness is required for the electrophotographic member, a fine particle (fine particle for controlling roughness) for controlling roughness may be added to the electroconductive layer. Usable fine particles for controlling the roughness include a fine particle of a polyurethane resin, a polyester resin, a polyether resin, a polyamide resin, an acrylic resin or a phenol resin. A volume average particle size of the fine particles for controlling roughness is preferably 1 µm or larger and 15 µm or smaller. It is preferable that the content of the fine particle for controlling roughness in the electroconductive layer is 1 part by mass or more and 50 parts by mass or less, with respect to 100 parts by mass of the resin which forms the electroconductive layer.

A method for forming the electroconductive layer is not limited in particular, and includes: a coating forming method by spray, immersion or roll coating of such a liquid composition (paint) that a raw material is dispersed in a solvent; and a known resin molding method which uses a pelletized resin composition of a raw material.

When the raw material of the electroconductive layer is pellet-shaped, the electroconductive layer can be formed by extrusion molding, coating forming, forming by lamination of sheets, injection molding or the like. Specifically, in the case of extrusion molding, a support member coated with an adhesive as needed is installed in a molding die, and the above described resin composition which has been heated and melted is injected into the molding die, and is extruded and molded together with the support member. In the case of coating forming, the above described liquid composition which is dispersed in the solvent is applied onto a support member with the use of an application apparatus such as a spray, the solvent is dried, and the electroconductive layer is formed on the support member. In addition, in the case of the forming by lamination of the sheets, the above described resin composition which has been molded into a sheet shape by extrusion molding or the like is laminated with and formed on the support member coated with the adhesive. In addition, in the case of injection molding, the above described resin composition is injected into a cavity in the die, is cooled, and is molded. It is preferable that a thickness of the electroconductive layer is 1.0 µm or larger and 100.0 µm or smaller.

When the electroconductive layer is formed, an adhesive layer can be formed on the support member as needed. Examples of a material of the adhesive layer include a polyurethane type, a polyester type, an ethylene vinyl alcohol type (EVA type) and a polyamide type, which are hot melt types.

An electrophotographic member according to one embodiment of the present disclosure can be applied to any of a non-contact type developing apparatus and a contact type developing apparatus which use a magnetic one-component developer or a non-magnetic one-component developer, and a developing apparatus which uses a two-component developer.

<Process Cartridge>

A process cartridge according to one embodiment of the present disclosure is a process cartridge configured to be detachably attached to a main body of an electrophotographic image forming apparatus, and has at least one unit which is selected from the group consisting of a charging unit, a developing unit and a cleaning unit. At least one of the units has the electrophotographic member according to the present embodiment.

Figure 4:
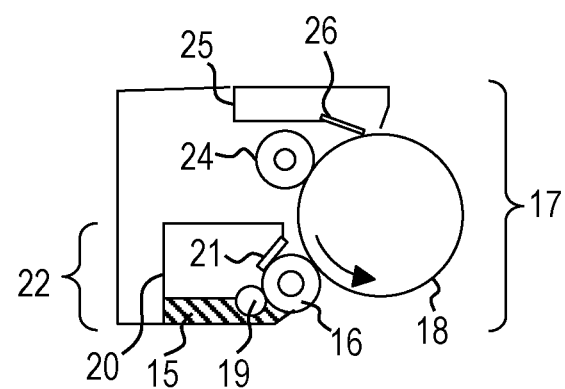
FIG. 4 is a schematic configuration view illustrating a process cartridge according to one embodiment of the present disclosure.

FIG. 4 is a cross-sectional view illustrating one example of the process cartridge according to the present embodiment. In a process cartridge 17 illustrated in FIG. 4, a developing roller 16, a developing blade 21 and a developing apparatus 22, an electrophotographic photosensitive body 18, a cleaning blade 26, a waste toner storage container 25 and a charging roller 24 are integrated. In addition, the process cartridge 17 is configured to be detachably attached to the main body of the electrophotographic image forming apparatus. The developing apparatus 22 includes a toner container 20, and the toner container 20 is filled with a toner 15. The toner 15 is supplied to the surface of the developing roller 16 by a toner supplying roller 19, and a layer of the toner 15 having a predetermined thickness is formed on the surface of the developing roller 16 by the developing blade 21.

<Electrophotographic Image Forming Apparatus>

An electrophotographic image forming apparatus according to one embodiment of the present disclosure has the electrophotographic member according to the present disclosure, as at least one selected from the group consisting of a charging member, a developing member and a cleaning member.

Figure 5:
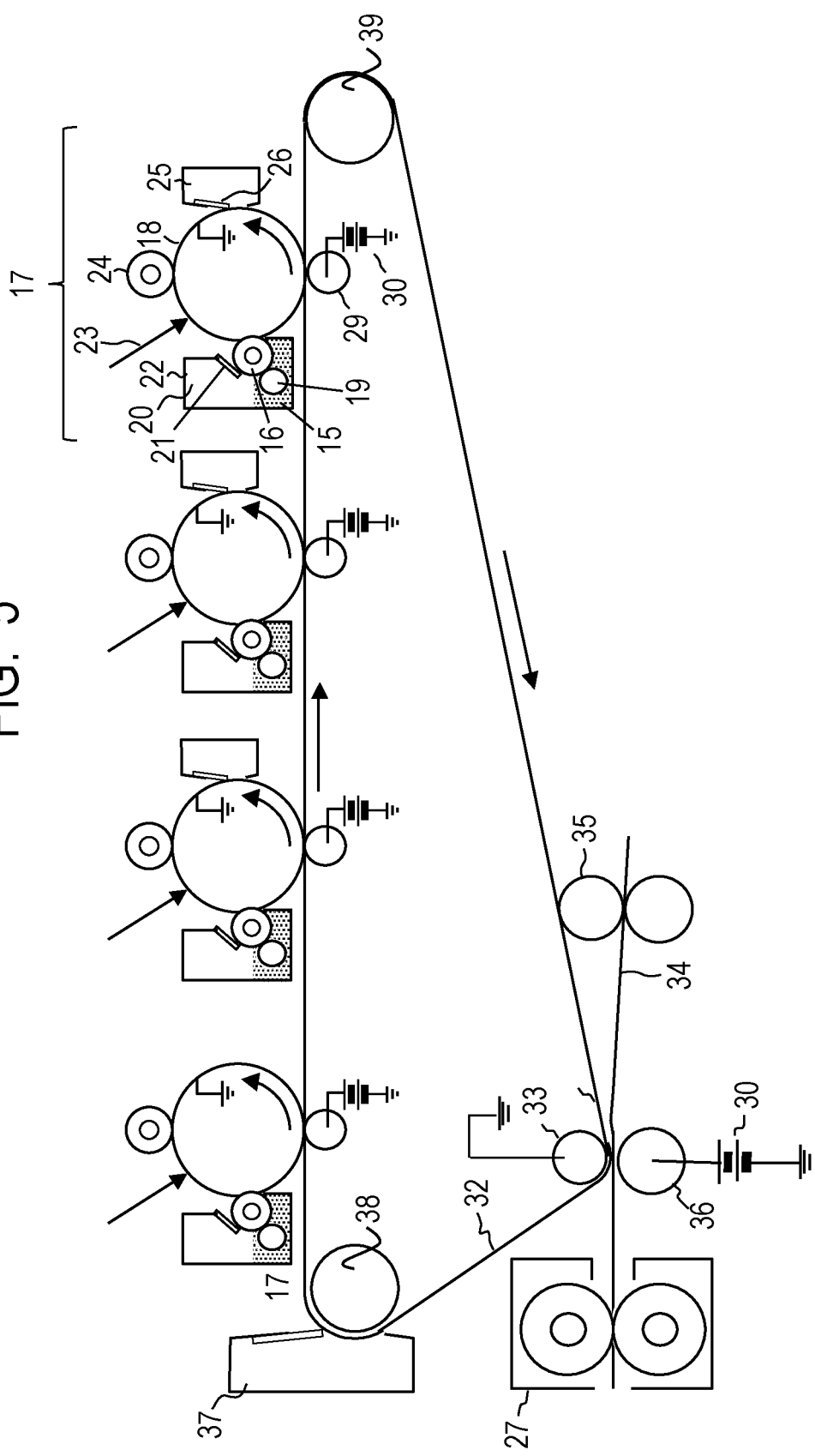
FIG. 5 is a schematic configuration view illustrating an electrophotographic image forming apparatus according to one embodiment of the present disclosure.

FIG. 5 is a cross-sectional view illustrating one example of an electrophotographic image forming apparatus which uses the electrophotographic member according to the present disclosure as a developing blade. On the electrophotographic image forming apparatus of FIG. 5, the developing apparatus 22 is attachably/detachably mounted which includes the developing roller 16, the toner supplying roller 19, the toner container 20 and the developing blade 21. The developing apparatus 22 is prepared for each color toner of yellow (Y), magenta (M), cyan (C) and black (Bk), and enables color printing.

In addition, in the electrophotographic image forming apparatus, the process cartridge 17 is attachably/detachably mounted which includes the electrophotographic photosensitive body 18, the cleaning blade 26, the waste toner storage container 25 and the charging roller 24. Incidentally, the electrophotographic photosensitive body 18, the cleaning blade 26, the waste toner storage container 25 and the charging roller 24 may be disposed in the main body of the electrophotographic image forming apparatus.

A printing operation of the electrophotographic image forming apparatus will be described below. The electrophotographic photosensitive body 18 rotates in the direction of the arrow, and is uniformly electrically charged by the charging roller 24 for electrically charging the electrophotographic photosensitive body 18. Then, an electrostatic latent image is formed on the surface of the electrophotographic photosensitive body 18 by laser light 23 that is an exposure unit which writes the electrostatic latent image. The electrostatic latent image is developed by the toner 15 that is given to the electrostatic latent image by the developing apparatus 22, from the developing roller 16 which is arranged in contact with the electrophotographic photosensitive body 18; and is visualized as a toner image.

The development is so-called reversal development in which the toner image is formed on the exposed portion. An intermediate transfer belt 32 that is an intermediate transfer body formed of an endless belt and acts as a second image-carrying body which carries a toner image thereon is arranged so as to face the electrophotographic photosensitive body 18 of each of the process cartridges 17. The intermediate transfer belt 32 is stretched over a tension roller 38, a drive roller 39 and a secondary transfer facing roller 33 which function as a plurality of stretching rollers; and is stretched by a predetermined tension. The intermediate transfer belt 32 rotates (circumferentially moves) in the direction of the arrow in FIG. 5 at circumferential velocity (process speed) equal to the circumferential velocity of the electrophotographic photosensitive body 18, due to the driving roller 39 which is rotationally driven. A primary transfer roller 29 which functions as a primary transfer unit is arranged on the inner circumferential surface side of the intermediate transfer belt 32 so as to correspond to each of the electrophotographic photosensitive bodies 18.

The primary transfer roller 29 is pressed toward the electrophotographic photosensitive body 18 via the intermediate transfer belt 32, and forms a primary transfer portion at which the electrophotographic photosensitive body 18 and the intermediate transfer belt 32 come in contact with each other. As described above, the toner image which has been formed on the electrophotographic photosensitive body 18 is transferred (primary transfer) onto the rotating intermediate transfer belt 32 at the primary transfer portion. For example, when forming a full-color image, toner images of each color of yellow, magenta, cyan and black, which have been formed on the respective electrophotographic photosensitive bodies 18 are sequentially transferred so as to be superimposed on the intermediate transfer belt 32.

A secondary transfer roller 36 which functions as a secondary transfer unit is arranged at a position facing the secondary transfer facing roller 33, on the outer circumferential surface side of the intermediate transfer belt 32. The secondary transfer roller 36 is pressed toward the secondary transfer facing roller 33 via the intermediate transfer belt 32, and forms a secondary transfer portion at which the intermediate transfer belt 32 and the secondary transfer roller 36 come in contact with each other. The toner image that has been transferred onto the intermediate transfer belt 32 as described above is transferred (secondarily transferred) onto a recording material 34 such as paper, which is sandwiched between the intermediate transfer belt 32 and the secondary transfer roller 36 and is conveyed, at the secondary transfer portion. The recording material 34 is supplied by a resist roller 35, to the secondary transfer portion at the timing which has been matched with the toner image on the intermediate transfer belt 32. The recording material 34 onto which the toner image has been transferred is conveyed to a fixing apparatus 27 which functions as a fixing unit, is subjected to fixing treatment in the fixing apparatus 27, and is discharged to the outside of the apparatus; and the printing operation is completed. Incidentally, a voltage is applied to the primary transfer roller 29 and the secondary transfer roller 36 from a bias power supply 30. Adherents such as a toner (primary transfer residual toner) which has remained on the electrophotographic photosensitive body 18 after the primary transfer step are scraped off by the cleaning blade 26 which is a cleaning member for cleaning the surface of the photosensitive body; and are accommodated in the waste toner storage container 25. In addition, adherents such as a toner (secondary transfer residual toner) which has remained on the intermediate transfer belt 32 after the secondary transfer step are removed from the intermediate transfer belt 32 by a belt cleaning apparatus 37 which functions as an intermediate transfer body cleaning unit, and are collected.

The developing apparatus 22 includes the toner container 20 which stores the toner 15 of the one-component developer, and the developing roller 16 that is positioned in the opening which extends in the longitudinal direction of the toner container 20, and acts as the developer-carrying body provided so as to face the electrophotographic photosensitive body 18. The developing apparatus 22 is configured so as to develop the electrostatic latent image on the electrophotographic photosensitive body 18 and visualize the image.

According to one aspect of the present disclosure, there can be obtained the electrophotographic member, which has the excellent electroconductivity and can form the high quality electrophotographic image even in the long-term use. In addition, according to another aspect of the present disclosure, there can be obtained the process cartridge that contributes to the stable formation of the high quality electrophotographic image. In addition, according to another aspect of the present disclosure, there can be obtained the electrophotographic image forming apparatus that can stably form the high quality electrophotographic image.

EXAMPLE

Specific examples and comparative examples will be shown below, but the present disclosure is not limited to these examples.

<Synthesis of Ion Conductive Agent>

The ion conductive agent can be obtained by a synthesis of a precursor, which is performed with the use of a nucleophilic substitution reaction such as Menshutkin reaction in one step or in a plurality of steps, and by an ion exchange reaction which is performed subsequently. At this time, a target ion conductive agent can be synthesized by an operation of changing a nucleophilic agent which is used in the nucleophilic substitution reaction, an electrophilic agent, and an alkali metal (ion exchange salt) which is used in the ion exchange reaction, to a desired combination.

[Provision of Nucleophilic Agent]

The nucleophilic agent which is used for a nucleophilic substitution reaction can be obtained by the reaction of a ketone compound, an aldehyde compound and an ammonium acetate, which is performed under an acid catalyst.

[Ketone Compound]

Materials shown in the following Table 1 were provided as alkene compounds which were used for synthesis of a ketone compound.

TABLE 1

| No. | Alkene compound |
| --- | --- |
| C-1 | Octatriacont-19-ene (made by 177 CheMall) |
| C-2 | Pentacos-12-ene (made by 177 CheMall) |
| C-3 | 9-Eicosene (made by Toronto Research Chemicals, Inc.) |
| C-4 | 13-Methyltricos-11-ene (made by 177 CheMall) |
| C-5 | Nonacos-9-ene (made by 177 CheMall) |
| C-6 | Hentriacont-3-ene (made by 177 CheMall) |

(Synthesis of Ketone Compound No. B-1)

To an eggplant flask equipped with a Dimroth condenser, in which a stirrer was placed, 0.01 g of osmium oxide (VIII) (microencapsulated, made by Kanto Chemical Co., Inc.), 2.0 ml of pure water (made by Kanto Chemical Co., Inc.), 2.0 ml of acetone (made by Kanto Chemical Co., Inc.), 2.0 ml of acetonitrile (made by Kanto Chemical Co., Inc.), and 0.42 ml of 4-methylmorpholine N-oxide (made by Tokyo Chemical Industry Co., Ltd.) were added, and the mixture was stirred at room temperature. Next, such a solution that 0.53 g of alkene compound No. C-1 was dissolved in 1.0 ml of acetone was added dropwise, and the mixture was stirred at room temperature for 12 hours.

Next, the reaction liquid was filtered, the insoluble matter was washed with methanol, and the solvent of the obtained filtrate was distilled off under reduced pressure. Into the obtained concentrate, 3.52 mg of Nor-AZADO (made by Fujifilm Wako Pure Chemical Corporation) and 0.65 ml of dichloromethane (made by Fujifilm Wako Pure Chemical Corporation) were added, and were dissolved therein. Furthermore, 0.33 ml of diisopropyl azodicarboxylate (made by Fujifilm Wako Pure Chemical Corporation) and 48.6 µl of acetic acid (made by Fujifilm Wako Pure Chemical Corporation) were added, and the mixture was reacted at a temperature of 45° C. for 6 hours. Next, 2.0 ml of a saturated aqueous solution of sodium hydrogen carbonate was added, and the mixture was stirred at room temperature for 30 minutes. The obtained reaction liquid was separated by dichloromethane/water, and the organic layer was collected. The collected organic layer was washed twice with pure water, and the solvent was distilled off under reduced pressure. Subsequently, the obtained residual material was purified by silica gel chromatography (hexane/diethyl ether 4:1 (v/v)), and thereby the ketone compound No. B-1 was obtained.

(Synthesis of Ketone Compounds Nos. B-2 to B-6)

The ketone compounds Nos. B-2 to B-6 were synthesized in a similar way to the ketone compound No. B-1, except that the alkene compound and the amount thereof to be added were changed as were described in Table 2.

TABLE 2

| Ketone compound | Alkene compound | |
| --- | --- | --- |
| No. | No. | Added amount (g) |
| B-1 | C-1 | 0.53 |
| B-2 | C-2 | 0.35 |
| B-3 | C-3 | 0.28 |
| B-4 | C-4 | 0.34 |
| B-5 | C-5 | 0.41 |
| B-6 | C-6 | 0.43 |

(Ketone Compounds Nos. B-7 to B-10)

Materials shown in the following Table 3 were provided as ketone compounds Nos. B-7 to B-10.

TABLE 3

| No. | Ketone compound |
| --- | --- |
| B-7 | 9,10-Octadecanedione (made by 177 CheMall) |
| B-8 | 12,13-Tetracosanedione (made by 177 CheMall) |
| B-9 | 16,17-Dotriacontanedione (made by 177 CheMall) |
| B-10 | Dodecane-2,3-dione (made by 177 CheMall) |

[Aldehyde Compound]

Materials shown in the following Table 4 were provided as aldehyde compounds to be used for syntheses of nucleophilic agents Nos. A-1 to A-11.

TABLE 4

| No. | Aldehyde compound |
|---|---|
| D-1 | Paraformaldehyde (made by Tokyo Chemical Industry Co., Ltd.) |
| D-2 | Acetaldehyde (made by Tokyo Chemical Industry Co., Ltd.) |

(Nucleophilic Agent)
(Synthesis of Nucleophilic Agent No. A-1)

To an eggplant flask equipped with a Dimroth condenser, in which a stirrer was placed, 4.96 g of the ketone compound No. B-7, 0.58 g of Aldehyde No. D-1, and 2.96 g of ammonium acetate (made by Kanto Chemical Co., Inc.) were charged; and 45.0 ml of ethanol (made by Kanto Chemical Co., Inc.) was added thereinto, and was dissolved therein. Furthermore, 1.0 ml of acetic acid (made by Tokyo Chemical Industry Co., Ltd.) was added dropwise thereinto. After that, the mixture was stirred at a temperature of 110° C. for 4 hours.

Next, a saturated aqueous solution of sodium hydrogen carbonate was added so that the pH of the obtained reaction liquid would become 13. The reaction liquid of which the pH was adjusted was separated by dichloromethane/water, and then the organic layer was collected. The collected organic layer was washed twice with pure water, then the solvent was distilled off under reduced pressure, and the residual material was dried; and thereby the nucleophilic agent No. A-1 was obtained as a white powder.

(Synthesis of Nucleophilic Agents Nos. A-2 to A-11)

Figure 8:
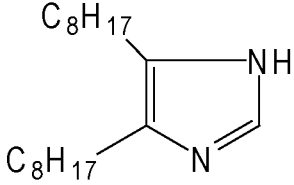
FIG. 8 is structural formulae of nucleophilic agents Nos. A-1 to A-11 which have been synthesized in the examples.

Nucleophilic agents Nos. A-2 to A-11 were synthesized in a similar way to the nucleophilic agent No. A-1, except that the ketone compound and the aldehyde compound were changed as were described in Table 5. Chemical structures of the nucleophilic agents Nos. A-1 to A-11 are illustrated in FIG. 8.

TABLE 5

| Nucleophilic agent No. | Ketone compound | | Aldehyde compound | |
|---|---|---|---|---|
| | No. | Added amount (g) | No. | Added amount (g) |
| A-1 | B-7 | 4.96 | D-1 | 0.58 |
| A-2 | B-8 | 5.86 | D-1 | 0.58 |
| A-3 | B-8 | 5.86 | D-2 | 0.84 |
| A-4 | B-9 | 7.65 | D-1 | 0.58 |
| A-5 | B-1 | 8.99 | D-1 | 0.58 |
| A-6 | B-2 | 6.08 | D-1 | 0.58 |
| A-7 | B-3 | 4.96 | D-1 | 0.58 |
| A-8 | B-4 | 5.86 | D-1 | 0.58 |
| A-9 | B-5 | 6.98 | D-1 | 0.58 |
| A-10 | B-10 | 3.17 | D-1 | 0.58 |
| A-11 | B-6 | 7.42 | D-1 | 0.58 |

(Nucleophilic Agents Nos. A-12 to A-13)

Materials shown in the following Table 6 were provided as nucleophilic agents Nos. A-12 to A-13.

TABLE 6

| No. | Nucleophilic agent |
|---|---|
| A-12 | Imidazole (made by Tokyo Chemical Industry Co., Ltd.) |
| A-13 | 2-Methylimidazole (made by Tokyo Chemical Industry Co., Ltd.) |

[Provision of Electrophilic Agent]
(Preparation of Electrophilic Agents Nos. E-1 to E-11)

Materials shown in the following Table 7 were provided as electrophilic agents Nos. E-1 to E-11 to be used for the synthesis of the ion conductive agent.

TABLE 7

| No. | Electrophilic agent |
|---|---|
| E-1 | 1-Bromooctane (made by Tokyo Chemical Industry Co., Ltd.) |
| E-2 | 1-Bromononane (made by Tokyo Chemical Industry Co., Ltd.) |
| E-3 | 1-Bromododecane (made by Tokyo Chemical Industry Co., Ltd.) |
| E-4 | 1-Bromoeicosane (made by Tokyo Chemical Industry Co., Ltd.) |
| E-5 | Iodomethane (made by Tokyo Chemical Industry Co., Ltd.) |
| E-6 | 1-Bromotridecane (made by Tokyo Chemical Industry Co., Ltd.) |
| E-7 | 1-Bromodecane (made by Tokyo Chemical Industry Co., Ltd.) |
| E-8 | 3-(Bromomethyl)tridecane (made by Aldlab Chemicals, LLC) |
| E-9 | 1-bromooctadecane (made by Tokyo Chemical Industry Co., Ltd.) |
| E-10 | Bromoethane (made by Tokyo Chemical Industry Co., Ltd.) |
| E-11 | 1-Bromohenicosane (made by 1717 CheMall) |

[Provision of Ion Exchange Salt]
(Provision of Ion Exchange Salts No. F-1 to F-6)

Materials shown in the following Table 8 were provided as the ion exchange salt to be used for the synthesis of the ion conductive agent.

TABLE 8

| No. | Ion exchange salt |
|---|---|
| F-1 | Lithium trifluoromethanesulfonate (trade name: EF-15, made by Mitsubishi Materials Electronic Chemicals Co., Ltd.) |
| F-2 | Potassium N,N-bis(fluorosulfonyl)imide (trade name: K-FSI, made by Mitsubishi Materials Electronic Chemicals Co., Ltd.) |
| F-3 | Sodium dicyanamide (made by Tokyo Chemical Industry Co., Ltd.) |
| F-4 | Bis(trifluoromethanesulfonyl)imide (made by Kanto Chemical Co., Inc.) |
| F-5 | Bis(nonafluorobutanesulfonyl)imide (trade name: EF-N441S-30, 30% aqueous solution, made by Mitsubishi Materials Electronic Chemicals Co., Ltd.) |
| F-6 | Nonafluorobutanesulfonic acid (trade name: FBSA, made by Mitsubishi Materials Electronic Chemicals Co., Ltd.) |

[Provision of Ion Conductive Agent]
(Synthesis of Ion Conductive Agent No. I-1)

To an eggplant flask equipped with a Dimroth condenser, in which a stirrer was placed, 50 ml of tetrahydrofuran (THF) (made by Kanto Chemical Co., Inc.) was added, 24.5 g of sodium hydride (made by Kanto Chemical Co., Inc.) was dispersed in the THF, and the eggplant flask was cooled in an ice bath. Subsequently, such a solution that 17.0 g of nucleophilic agent No. A-12 was dissolved in 100 ml of THF was added dropwise to the eggplant flask. After that, the ice bath was detached, and the resultant liquid was stirred at room temperature (23° C.) for 2 hours.

Next, 121.5 g of electrophilic agent No. E-1 was added to the above described eggplant flask, then the mixture was heated under reflux at a temperature of 70° C. for 8 hours, and a reaction was caused. The reaction liquid was filtered, the insoluble matter was washed with THF, and the solvent of the obtained filtrate was distilled off under reduced pressure. The obtained concentrate was dissolved in dichloromethane again; the liquid was filtered; the filtrate was recovered; and the dichloromethane was distilled off under reduced pressure. The obtained concentrate was washed with diethyl ether and was dried under reduced pressure; and a precursor of the ion conductive agent No. I-1 was obtained.

Subsequently, the whole amount of the precursor of the ion conductive agent No. I-1 was dissolved in 100 ml of methanol. While the solution was stirred, 39.0 g of the ion exchange salt No. F-1 which was dissolved in 100 ml of pure water was added, and the mixture was stirred at room temperature for 24 hours. After the reaction, the methanol was distilled off under reduced pressure, the residual material was separated with dichloromethane/water, and then the organic layer was collected. The collected organic layer was washed twice with pure water, the solvent was distilled off under reduced pressure, and the residual material was dried; and thereby the ion conductive agent No. I-1 was obtained as a white powder.

(Syntheses of Ion Conductive Agents Nos. I-2 to I-10, I-15 to I-18, and I-20 to I-23)

The ion conductive agents Nos. I-2 to I-10, I-15 to I-18 and I-20 to I-23 were synthesized in a similar way to the ion conductive agent No. I-1, except that the types and the amounts to be added of the nucleophilic agent, the electrophilic agent and the ion exchange salt were changed as described in Table 9.

TABLE 9

| Ion conductive agent No. | Nucleophilic agent No. | Added amount (g) | Electrophilic agent No. | Added amount (g) | Ion exchange salt No. | Added amount (g) |
|---|---|---|---|---|---|---|
| I-1 | A-12 | 17.0 | E-1 | 121.5 | F-1 | 39.0 |
| I-2 | A-12 | 17.0 | E-2 | 130.3 | F-1 | 39.0 |
| I-3 | A-13 | 20.8 | E-2 | 130.3 | F-1 | 39.0 |
| I-4 | A-12 | 17.0 | E-3 | 156.8 | F-1 | 39.0 |
| I-5 | A-12 | 17.0 | E-4 | 227.4 | F-3 | 22.3 |
| I-6 | A-1 | 73.0 | — | — | F-4 | 70.3 |
| I-7 | A-2 | 94.0 | E-5 | 89.4 | F-2 | 54.8 |
| I-8 | A-3 | 97.8 | — | — | F-4 | 70.3 |
| I-9 | A-4 | 122.0 | — | — | F-4 | 70.3 |
| I-10 | A-5 | 143.0 | — | — | F-5 | 145.3 |
| I-15 | A-6 | 97.5 | — | — | F-5 | 145.3 |
| I-16 | A-7 | 80.0 | — | — | F-5 | 145.3 |
| I-17 | A-8 | 94.0 | — | — | F-6 | 75.0 |
| I-18 | A-9 | 111.5 | — | — | F-6 | 75.0 |
| I-20 | A-12 | 17.0 | E-5 | 89.4 | F-2 | 48.9 |
| I-21 | A-12 | 17.0 | E-11 | 236.2 | F-3 | 23.1 |
| I-22 | A-10 | 52.0 | — | — | F-4 | 70.3 |
| I-23 | A-11 | 118.5 | — | — | F-5 | 145.3 |

(Synthesis of Ion Conductive Agent No. I-11)

The following materials were added to a flask equipped with a Dimroth condenser, and were heated overnight under reflux.

Nucleophilic agent No. A-12: 6.8 g
Electrophilic agent No. E-3: 37.4 g
27.6 g of potassium carbonate (made by Kanto Chemical Co., Inc.)
200 ml of acetone After the reaction, the reaction liquid was filtered, and the solvent of the filtrate was distilled off under reduced pressure. After that, the obtained residual material was purified by silica gel column chromatography (ethyl acetate), and such a chemical compound was obtained that the nucleophilic agent was tertiarized. Subsequently, the obtained chemical compound was dissolved in 50 ml of dichloromethane, and 52.8 g of the electrophilic agent No. E-6 was added; and the mixture was heated under reflux at 40° C. for 20 hours. After the reaction, the solvent was distilled off under reduced pressure; the residual material was washed with diethyl ether, and was dried under reduced pressure; and a quaternized ion conductive agent precursor was obtained. Subsequently, in order to replace the anion with a target anion, the whole amount of the obtained ion conductive agent precursor was dissolved in 100 ml of methanol at room temperature. While the solution was stirred, 23.4 g of the ion exchange salt No. F-1 which was dissolved in 50 ml of pure water was added, and the mixture was stirred at room temperature for 24 hours. After the reaction, methanol in the solution was distilled off under reduced pressure, the residual material was separated with dichloromethane/water, and then the organic layer was collected. The collected liquid was washed twice with pure water, the solvent was distilled off under reduced pressure, the residual material was dried, and an ion conductive agent No. I-11 was obtained as a white powder.

(Synthesis of Ion Conductive Agents Nos. I-12 to I-14, and I-19)

The ion conductive agents Nos. I-12 to I-14 and I-19 were synthesized in a similar way to the ion conductive agent No. I-11, except that the types and the blended amounts of the electrophilic agent and the ion exchange salt were changed as described in Table 10.

TABLE 10

| Ion conductive agent No. | Nucleophilic agent No. | Added amount (g) | Electrophilic agent No. | Added amount (g) | No. | Added amount (g) | Ion exchange salt No. | Added amount (g) |
|---|---|---|---|---|---|---|---|---|
| I-11 | A-12 | 6.8 | E-3 | 37.4 | E-6 | 52.8 | F-1 | 23.4 |
| I-12 | A-12 | 6.8 | E-3 | 37.4 | E-7 | 44.2 | F-1 | 23.4 |
| I-13 | A-12 | 6.8 | E-7 | 33.1 | E-8 | 55.4 | F-2 | 32.9 |
| I-14 | A-12 | 6.8 | E-2 | 31.0 | E-9 | 66.6 | F-3 | 13.4 |
| I-19 | A-12 | 6.8 | E-5 | 21.3 | E-10 | 21.8 | F-1 | 23.4 |

The structures of the obtained ion conductive agents Nos. I-1 to I-23 are shown in Tables 11 to 13. Incidentally, in Tables 11 to 13, "-" represents a hydrogen atom.

TABLE 11

| Ion conductive agent No. | Cation structure | R11 | R12 | R13 | R14 | R15 | X1− |
|---|---|---|---|---|---|---|---|
| I-1 | Structural Formula (1) | — | $C_8H_{17}$ | — | — | $C_8H_{17}$ | $CF_3SO_3^-$ |
| I-2 | Structural Formula (1) | — | $C_9H_{19}$ | — | — | $C_9H_{19}$ | $CF_3SO_3^-$ |

TABLE 11-continued

| Ion conductive agent No. | Cation structure | R11 | R12 | R13 | R14 | R15 | X1$^-$ |
|---|---|---|---|---|---|---|---|
| I-3 | Structural Formula (1) | CH$_3$ | C$_9$H$_{19}$ | — | — | C$_9$H$_{19}$ | CF$_3$SO$_3$$^-$ |
| I-4 | Structural Formula (1) | — | C$_{12}$H$_{25}$ | — | — | C$_{12}$H$_{25}$ | CF$_3$SO$_3$$^-$ |
| I-5 | Structural Formula (1) | — | C$_{20}$H$_{41}$ | — | — | C$_{20}$H$_{41}$ | (CN)$_2$N$^-$ |
| I-11 | Structural Formula (1) | — | C$_{13}$H$_{27}$ | — | — | C$_{12}$H$_{25}$ | CF$_3$SO$_3$$^-$ |
| I-12 | Structural Formula (1) | — | C$_{10}$H$_{21}$ | — | — | C$_{12}$H$_{25}$ | CF$_3$SO$_3$$^-$ |
| I-13 | Structural Formula (1) | — | CH$_2$CH(C$_2$H$_5$)C$_{10}$H$_{21}$ | — | — | C$_{10}$H$_{21}$ | (FSO$_2$)$_2$N$^-$ |
| I-14 | Structural Formula (1) | — | C$_{18}$H$_{37}$ | — | — | C$_9$H$_{19}$ | (CN)$_2$N$^-$ |

TABLE 12

| Ion conductive agent No. | Cation structure | R21 | R22 | R23 | R24 | R25 | X2$^-$ |
|---|---|---|---|---|---|---|---|
| I-6 | Structural Formula (2) | — | — | C$_8$H$_{17}$ | C$_8$H$_{17}$ | — | (CF$_3$SO$_2$)$_2$N$^-$ |
| I-7 | Structural Formula (2) | — | CH$_3$ | C$_{11}$H$_{23}$ | C$_{11}$H$_{23}$ | CH$_3$ | (FSO$_2$)$_2$N$^-$ |
| I-8 | Structural Formula (2) | CH$_3$ | — | C$_{11}$H$_{23}$ | C$_{11}$H$_{23}$ | — | (CF$_3$SO$_2$)$_2$N$^-$ |
| I-9 | Structural Formula (2) | — | — | C$_{15}$H$_{31}$ | C$_{15}$H$_{31}$ | — | (CF$_3$SO$_2$)$_2$N$^-$ |
| I-10 | Structural Formula (2) | — | — | C$_{18}$H$_{37}$ | C$_{18}$H$_{37}$ | — | (C$_4$F$_9$SO$_2$)$_2$N$^-$ |
| I-15 | Structural Formula (2) | — | — | C$_{11}$H$_{23}$ | C$_{12}$H$_{25}$ | — | (C$_4$F$_9$SO$_2$)$_2$N$^-$ |
| I-16 | Structural Formula (2) | — | — | C$_8$H$_{17}$ | C$_{10}$H$_{21}$ | — | (C$_4$F$_9$SO$_2$)$_2$N$^-$ |
| I-17 | Structural Formula (2) | — | — | C$_{10}$H$_{21}$ | CH(CH$_3$)C$_{10}$H$_{21}$ | — | C$_4$F$_9$SO$_3$$^-$ |
| I-18 | Structural Formula (2) | — | — | C$_8$H$_{17}$ | C$_{19}$H$_{39}$ | — | C$_4$F$_9$SO$_3$$^-$ |

TABLE 13

| Ion conductive agent No. | Cation structure | R31 | R32 | R33 | R34 | R35 | X3$^-$ |
|---|---|---|---|---|---|---|---|
| I-19 | Structural Formula (5) | — | C$_2$H$_5$ | — | — | CH$_3$ | CF$_3$SO$_3$$^-$ |
| I-20 | Structural Formula (5) | — | CH$_3$ | — | — | CH$_3$ | (FSO$_2$)$_2$N$^-$ |
| I-21 | Structural Formula (5) | — | C$_{21}$H$_{43}$ | — | — | C$_{21}$H$_{43}$ | (CN)$_2$N$^-$ |
| I-22 | Structural Formula (5) | — | — | CH$_3$ | C$_9$H$_{19}$ | — | (CF$_3$SO$_2$)$_2$N$^-$ |
| I-23 | Structural Formula (5) | — | — | C$_2$H$_5$ | C$_{27}$H$_{55}$ | — | (C$_4$F$_9$SO$_2$)$_2$N$^-$ |

Incidentally, in Table 13, Structural Formula (5) represents the following structure.

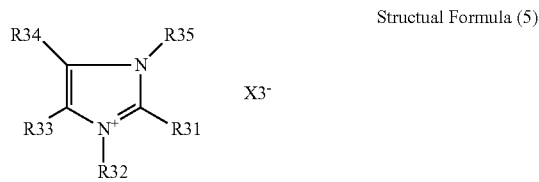

Structual Formula (5)

(Ion Conductive Agents Nos. I-24 to I-25)

Methyl-trioctyl ammonium bis(trifluoromethylsulfonyl) imide (made by Aldrich) was provided as the ion conductive agent No. I-24. In addition, 1-hexadecyl-3-methylimidazolium bis(trifluoromethylsulfonyl)imide (made by Kanto Chemical Co., Inc.) was provided as the ion conductive agent No. I-25.

Example 1

<Production of Developing Blade>

To 100 parts by mass of a thermoplastic acrylic resin (Mw=56500, trade name: Clarity LA 4285, made by Kuraray Co., Ltd.), 5.0 parts by mass of ion conductive agent No. I-2 was added, and the mixture was extruded into a columnar shape with a diameter of 3 mm, with the use of a twin-screw kneading extruder (trade name: TEM-26SX, made by Toshiba Machine Co., Ltd.). Furthermore, the extruded column was cut into pellet shapes each of which has a diameter of 3 mm, and a length of 3 mm by a cutting machine, and a resin material was produced. As the support member, a long sheet of a SUS-304-CSP-1/2H material was used, which had a width of 15.2 mm in a transverse direction and had a thickness of 0.08 mm. Next, the resin material was melted at 200° C. and extruded with an extrusion molding machine to the surface of the support member having a length of 226 mm, and coated the surface of the tip side of the support member with the molten resin material. Then, the resin material was cured and a developing blade 104 according to Example 1, which had a structure illustrated in FIG. 2A, was obtained.

<Evaluation of Developing Blade>

(Measurement of Resistance of Blade)

Figure 6A:
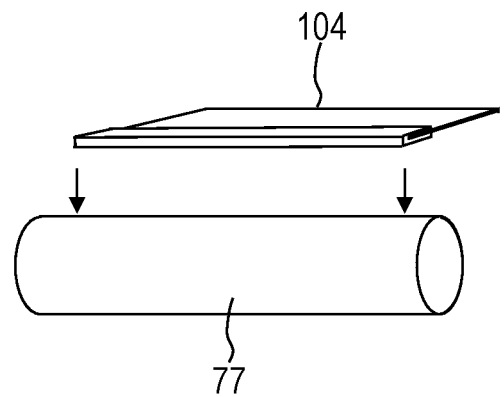
FIGS. 6A and 6B illustrate schematic views of an apparatus for measuring a current value of the developing blade.
Figure 6B:
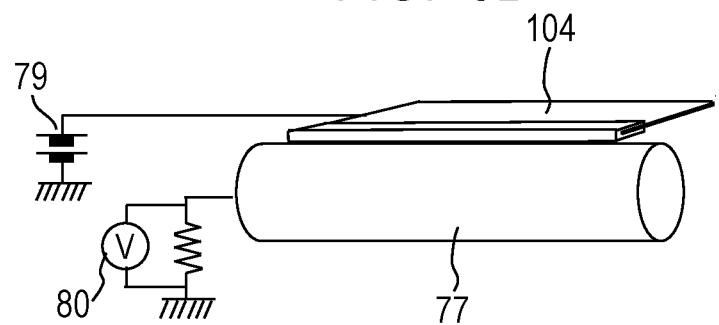

A resistance of the blade was measured with the use of a resistance value evaluation jig illustrated in FIGS. 6A and 6B, in the following way. In FIGS. 6A and 6B, the developing blade 104 is fixed to a columnar metal 77 having a diameter of 40 mm so that the contact pressure is 4.9N. A voltage of 50 V was applied by a high voltage power supply 79, and a potential difference between both ends of the resistor was measured which was arranged between the columnar metal 77 and the ground and had a known electrical resistance (electrical resistance lower than electrical resistance of developing blade by 2 digits or more). A voltmeter 80 (trade name: 189TRUE RMS MULTIMETER, made by Fluke Corporation) was used for measuring the potential difference. An electric current which flowed to the columnar metal via the developing blade was determined by a calculation based on the measured potential difference and the electrical resistance of the resistor. An electrical resistance value of the developing blade was determined by dividing the applied voltage of 50 V by the obtained electric current.

Here, as for the measurement of the potential difference, the potential differences were sampled for 3 seconds after 2 seconds after voltage application, and a value calculated from the average value was determined to be a resistance value of the blade. Incidentally, the developing blade was used which was stood still in a humidity of 80% RH (H/H environment) at a temperature of 30° C. for 6 hours or longer, and was subjected to the measurement.

(Measurement of Taber Abrasion Loss)

To a glass container to which 15.0 g of the resin material was charged that was used for producing the developing blade, 70.0 g of m-cresol (made by Tokyo Chemical Industry Co., Ltd.) was added, and the resin material was dissolved therein. Next, a film of a resin material solution was produced on an aluminum sheet with a thickness of 0.2 mm, with the use of a bar coater. After that, the film was dried under reduced pressure at a temperature of 160° C. and a pressure of 6.7 kPa for 4 hours, and a resin layer of 30 μm was formed on an aluminum sheet. The Taber abrasion test was conducted by the method based on JIS K7204. A rotary abrasion tester (made by Toyo Seiki Seisaku-sho, Ltd.) was used as the measuring apparatus, and CS-17 was used as an abrasive wheel. An amount of reduced mass after 1000 revolutions was measured under conditions of a load of 4.9 N and a rotational speed of 60 rpm, and the obtained result was determined to be the Taber abrasion loss.

(Evaluation of Fogging in End Portion)

The fogging was evaluated in an H/H environment, in the following way. Firstly, a laser printer made by HP (trade name: HP Laser Jet Enterprise Color M553dn) was prepared as an evaluation machine. A black cartridge which incorporated the developing blade according to Example 1 therein was loaded in the evaluation machine. After an image with a printing rate of 1% was output, a white solid image was output. The printer was stopped on the way of outputting the white solid image, the developer having adhered to the photosensitive body was peeled off with a tape (trade name: CT18, made by Nichiban Co., Ltd.), and the reflectance was measured with a reflection densitometer (trade name: TC-6DS/A, made by Tokyo Denshoku Co., Ltd.). A decrease amount of the reflectance with reference to the reflectance of the tape was measured, and the measured amount was determined to be a fogging value. As for the measurement of the reflectance, positions of 8.0 cm each apart from the center of the photosensitive body toward the longitudinal end were determined to be the measurement positions.

A fogging value at the end, which was measured after the output of 100 sheets of images with a printing rate of 1% was determined to be an initial fogging value, and a fogging value which was measured after the output of 20,000 sheets was determined to be a fogging value after a durability test. Incidentally, when the developer ran out, the developer was appropriately supplied, and the durability test was performed.

Examples 2 to 17

The developing blades according to Examples 2 to 17 were produced in a similar way to that in Example 1, except that the thermoplastic resin and the ion conductive agent which were used for producing the developing blade were changed as were described in Tables 14 to 15.

Comparative Examples 1 to 7

The developing blades according to Comparative Examples 1 to 7 were produced in a similar way to that in Example 1, except that the thermoplastic resin and the ion conductive agent which were used for producing the developing blade were changed as were described in Table 16.

The developing blades according to the above described Examples 2 to 17 and Comparative Examples 1 to 7 were evaluated in a similar way to that in Example 1. The evaluation results are shown in Tables 17 to 19. Incidentally, in Table 17, "2.8E6", for example, of the resistance value of the blade in Example 1 means "2.8×10$^6$".

TABLE 14

|  |  | Example 1 | Example 2 | Example 3 | Example 4 | Example 5 | Example 6 | Example 7 | Example 8 |
|---|---|---|---|---|---|---|---|---|---|
| Ion conductive agent | No. | I-2 | I-3 | I-4 | I-4 | I-5 | I-7 | I-8 | I-9 |
|  | Form at 30° C. | Solid | Solid | Solid | Solid | Solid | Solid | Solid | Solid |
|  | Added amount (parts by mass) | 5.2 | 5.4 | 6.0 | 6.0 | 6.1 | 4.8 | 5.8 | 6.7 |
| Thermoplastic resin | Name | Acrylic resin (trade name: Clarity LA 4285, made by Kuraray Co., Ltd.) | | | Polyamide resin (trade name: Pebax MV1074, made by Arkema K. K) | Acrylic resin (trade name: Clarity LA 4285, made by Kuraray Co., Ltd.) | | | |
|  | Parts by mass | 100.0 | 100.0 | 100.0 | 100.0 | 100.0 | 100.0 | 100.0 | 100.0 |

TABLE 15

|  |  | Example 9 | Example 10 | Example 11 | Example 12 | Example 13 | Example 14 | Example 15 | Example 16 | Example 17 |
|---|---|---|---|---|---|---|---|---|---|---|
| Ion conductive agent | No. | I-10 | I-11 | I-12 | I-13 | I-14 | I-15 | I-16 | I-17 | I-18 |
|  | Form at 30° C. | Solid | Solid | Solid | Solid | Solid | Solid | Solid | Solid | Solid |
|  | Added amount (parts by mass) | 10.1 | 6.1 | 5.7 | 4.8 | 4.5 | 8.5 | 7.9 | 5.9 | 6.5 |
| Thermoplastic resin | Name | Urethane resin (trade name: RESAMIN P-1000, made by Dainichiseika Color & Chemicals Co., Ltd.) | Polyamide resin (trade name: Pebax MV1074, made by Arkema K. K) | | | | Urethane resin (trade name: RESAMIN P-1000, made by Dainichiseika Color & Chemicals Co., Ltd.) | | Ester resin (trade name: Hytrel 4001T-X04, made by DU PONT-TORAY CO., LTD.) | |
|  | Parts by mass | 100.0 | 100.0 | 100.0 | 100.0 | 100.0 | 100.0 | 100.0 | 100.0 | 100.0 |

TABLE 16

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| Ion conductive agent | No. | I-19 | I-20 | I-21 | I-22 | I-23 | I-24 | I-25 |
|  | Form at 30° C. | Liquid | Solid | Solid | Liquid | Solid | Liquid | Solid |
|  | Added amount (parts by mass) | 3.4 | 2.1 | 6.3 | 4.0 | 9.1 | 5.7 | 5.1 |
| Thermoplastic resin | Name | Acrylic resin (trade name: Clarity LA 4285, made by Kuraray Co., Ltd.) | Polyamide resin (trade name: Pebax MV1074, made by Arkema K. K) | Urethane resin (trade name: RESAMIN P-1000, made by Dainichiseika Color&Chemicals Co., Ltd.) | Polyester resin (trade name: Hytrel 4001T-X04, made by DU PONT-TORAY CO., LTD.) |  | Acrylic resin (trade name: Clarity LA 4285, made by Kuraray Co., Ltd.) |  |
|  | Parts by mass | 100.0 | 100.0 | 100.0 | 100.0 | 100.0 | 100.0 | 100.0 |

TABLE 17

|  | Structure of ion conductive agent | Number of carbon atoms of functional group | | | | | Resistance value of blade ($\Omega$) | Taber abrasion loss (mg) | Fogging in end portion (%) | |
|---|---|---|---|---|---|---|---|---|---|---|
|  |  | R11 R21 | R12 R22 | R13 R23 | R14 R24 | R15 R25 |  |  | Initial | After durability test |
| Example 1 | Structural Formula (1) | 0 | 9 | 0 | 0 | 9 | 3.1E6 | 2.2 | 0.9 | 1.1 |
| Example 2 | Structural Formula (1) | 1 | 9 | 0 | 0 | 9 | 2.5E6 | 2.1 | 0.8 | 1.1 |
| Example 3 | Structural Formula (1) | 0 | 12 | 0 | 0 | 12 | 3.3E6 | 2.0 | 0.8 | 1.0 |
| Example 4 | Structural Formula (1) | 0 | 12 | 0 | 0 | 12 | 2.1E7 | 2.4 | 0.9 | 1.2 |
| Example 5 | Structural Formula (1) | 0 | 20 | 0 | 0 | 20 | 3.5E6 | 2.0 | 0.8 | 1.0 |
| Example 6 | Structural Formula (2) | 0 | 1 | 11 | 11 | 1 | 2.8E6 | 2.1 | 0.9 | 1.1 |
| Example 7 | Structural Formula (2) | 1 | 0 | 11 | 11 | 0 | 3.5E6 | 2.2 | 0.8 | 1.1 |
| Example 8 | Structural Formula (2) | 0 | 0 | 15 | 15 | 0 | 2.7E6 | 2.1 | 0.9 | 1.0 |
| Example 9 | Structural Formula (2) | 0 | 0 | 18 | 18 | 0 | 3.3E6 | 1.1 | 0.8 | 1.0 |

TABLE 18

|  | Structure of ion conductive agent | Number of carbon atoms of functional group | | | | | Resistance value of blade ($\Omega$) | Taber abrasion loss (mg) | Fogging in end portion (%) | |
|---|---|---|---|---|---|---|---|---|---|---|
|  |  | R11 R21 | R12 R22 | R13 R23 | R14 R24 | R15 R25 |  |  | Initial | After durability test |
| Example 10 | Structural Formula (1) | 0 | 13 | 0 | 0 | 12 | 1.7E7 | 3.1 | 0.8 | 1.5 |
| Example 11 | Structural Formula (1) | 0 | 10 | 0 | 0 | 12 | 2.1E7 | 3.2 | 0.8 | 1.5 |
| Example 12 | Structural Formula (1) | 0 | 12 (*) | 0 | 0 | 10 | 2.3E7 | 4.1 | 0.9 | 1.7 |
| Example 13 | Structural Formula (1) | 0 | 18 | 0 | 0 | 9 | 1.9E7 | 5.2 | 0.9 | 2.0 |
| Example 14 | Structural Formula (2) | 0 | 0 | 11 | 12 | 0 | 2.5E6 | 2.8 | 0.9 | 1.5 |
| Example 15 | Structural Formula (2) | 0 | 0 | 8 | 10 | 0 | 2.9E6 | 2.9 | 0.9 | 1.5 |
| Example 16 | Structural Formula (2) | 0 | 0 | 10 | 11 (*) | 0 | 1.0E6 | 3.5 | 0.8 | 1.7 |
| Example 17 | Structural Formula (2) | 0 | 0 | 8 | 19 | 0 | 0.8E6 | 4.5 | 0.9 | 2.0 |

(*) Number of carbon atoms in the longest hydrocarbon chain among branched hydrocarbon chains

TABLE 19

|  | Structure of ion conductive agent | Number of carbon atoms of functional group | | | | | Resistance value of blade ($\Omega$) | Taber abrasion loss (mg) | Fogging in end portion (%) | |
|---|---|---|---|---|---|---|---|---|---|---|
|  |  | R31 R41 | R32 R42 | R33 R43 | R34 R44 | R35 — |  |  | Initial | After durability test |
| Comparative example 1 | Structural Formula (5) | 0 | 2 | 0 | 0 | 1 | 2.3E6 | 93.4 | 0.8 | 6.1 |
| Comparative example 2 | Structural Formula (5) | 0 | 1 | 0 | 0 | 1 | 5.2E6 | 90.1 | 1.0 | 6.3 |
| Comparative example 3 | Structural Formula (5) | 0 | 21 | 0 | 0 | 21 | 3.5E7 | 102.1 | 1.1 | 6.5 |
| Comparative example 4 | Structural Formula (5) | 0 | 0 | 1 | 9 | 0 | 3.3E6 | 84.7 | 0.9 | 7.0 |
| Comparative example 5 | Structural Formula (5) | 0 | 0 | 2 | 27 | 0 | 1.3E6 | 89.3 | 1.1 | 6.3 |
| Comparative example 6 | Structural Formula (6) | 8 | 8 | 8 | 1 | — | 4.1E6 | 105.3 | 1.1 | 7.5 |
| Comparative example 7 | Structural Formula (5) | 0 | 1 | 0 | 0 | 16 | 5.3E6 | 99.5 | 1.0 | 7.3 |

In Table 19, Structural Formula (6) represents the following structure.

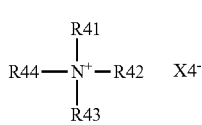

Structural Formula (6)

In the developing blades according to Comparative Examples 1 to 5 and 7, the ion conductive agents have an imidazolium skeleton, but do not have a structure represented by Structural Formula (1) or Structural Formula (2). Because of this, the Taber abrasion loss was as large as 80 mg or larger, and fogging in an end portion after the durability test was also as high as 6% or higher. The developing blade according to Comparative Example 6 contains a quaternary ammonium salt as the ion conductive agent. The quaternary ammonium salt has a structure of which the degree of freedom is high, compared to that of the imidazolium skeleton having a rigid structure. It is considered that because of this, even though the quaternary ammonium salt has a functional group having 8 carbon atoms, the excluding volume becomes large, and it has become difficult similarly to Comparative Example 3 to be entangled with the matrix polymer, and the Taber abrasion loss and the value of fogging in an end portion after the durability test have increased.

On the other hand, in the developing blades according to Examples 1 to 5 and 10 to 13 having the structure represented by Structural Formula (1) and Examples 6 to 9 and 14 to 17 having the structure represented by Structural Formula (2), the entanglement between the functional group and the matrix polymer becomes easy to occur. The entanglement between the ion conductive agent and the matrix polymer acts as a pseudo-crosslinking point; and accordingly could reinforce the matrix polymer, and reduce the Taber abrasion loss to 6 mg or smaller. In addition, because the abrasion loss can be reduced, the fogging in the end portion after the durability test also showed an adequate value of lower than 3%.

In Examples 1 to 12 and 14 to 16, an ion conductive agent is used in which a difference between the numbers of carbon atoms in the longest hydrocarbon chain of a saturated hydrocarbon group is 2 or less, which is bonded to the position 1 and the position 3 or the position 4 and the position 5 of the imidazolium ring. Because of this, the molecular mobilities of the hydrocarbon chains are close to each other; and it becomes easy that the hydrocarbon chains are entangled with the matrix polymer, and it is easier to form the pseudo-crosslinking point. As a result, the pseudo-crosslinking points increased; and the Taber abrasion loss was 4.1 mg or smaller, and the fogging in the end portion after the durability test also showed a further adequate value of lower than 2%. Furthermore, in the ion conductive agent used in Examples 1 to 11, 14 and 15, the functional group has a linear hydrocarbon structure represented by Structural Formula (3) or Structural Formula (4), and accordingly the steric hindrance of the side chain is small. Because of this, the entanglement with the matrix polymer became easier to occur; and the Taber abrasion loss was 3.2 mg or smaller, and the fogging in the end portion after the durability test also showed a further adequate value of lower than 1.8%.

In addition, in Examples 1 to 9, an ion conductive agent is used in which two functional groups bonded to the position 1 and the position 3 or the position 4 and the position 5 of the imidazolium ring are the same and have symmetry. Due to the functional groups having the symmetry, the crystallinity is enhanced, and the ion conductive agents which have been entangled with the matrix polymer strongly interact with each other, which thereby more strongly contributes to the enhancement of the abrasion resistance. Because of this, the Taber abrasion loss was 2.4 mg or smaller, and the fogging in the end portion after the durability test also showed a further adequate value of 1.2% or lower.

Example 18

<Production of Developing Roller>
(Production of Elastic Roller G-1)

A cored bar which was made from stainless steel (SUS 304) and had a diameter of 6 mm was coated with a primer (trade name: DY 35-051, made by Toray Dow Corning Co., Ltd.), then was baked for 20 minutes in an oven which was heated to a temperature of 180° C., and was prepared as a substrate.

As for a liquid material for forming the elastic layer, 15 parts by mass of carbon black (trade name TOKABLACK #4500, made by Tokai Carbon Co., Ltd.) was dispersed in 100 parts by mass of a liquid silicone rubber material (trade name SF 6905A/B, made by Dow Corning Toray Co.). The substrate was placed in a mold, and the cavity formed in the mold was filled with the liquid silicone rubber material; and the resultant mold was heated for 20 minutes in an oven which was heated to a temperature of 140° C.; and the liquid silicone rubber material was cured. After the mold was cooled, the substrate on which the silicone rubber layer was formed was removed from the mold, and was heated for 3 hours in an oven which was heated to a temperature of 190° C.; and the curing reaction of the silicone rubber was completed. As described above, an elastic roller G-1 was produced which had a silicone rubber elastic layer having a diameter of 12 mm formed on the outer circumference of the substrate.

(Synthesis of Isocyanate Group-Terminated Urethane Prepolymer H-1)

In a reaction container, 100 parts by mass of polypropylene glycol (trade name: polypropylene glycol 2000, made by Fujifilm Wako Pure Chemical Corporation) was added dropwise gradually into 45.3 parts by mass of polymeric MDI (trade name: Millionate MR200, made by Tosoh Corporation). The polypropylene glycol was added dropwise under a nitrogen atmosphere, while the temperature in the reaction container was kept at 65° C. After the dropwise addition was completed, the mixture was reacted at a temperature of 65° C. for 2 hours. The obtained reaction mixture was cooled to room temperature and was diluted with 60 parts by mass of methyl ethyl ketone (MEK); and 202.5 g of isocyanate group-terminated urethane prepolymer H-1 was obtained which had an isocyanate group content of 4.2%.

(Preparation of Paint for Forming Electroconductive Layer)

The following materials were stirred and mixed as a paint for forming an electroconductive layer.

Polyol (trade name: PPG 2000, made by Fujifilm Wako Pure Chemical Corporation): 50.5 parts by mass
  Isocyanate group-terminated urethane prepolymer H-1: 70.6 parts by mass
  Ion conductive agent I-2: 3.0 parts by mass
  Silica (trade name: Aerosil 130, made by Nippon Aerosil Co., Ltd.): 3.0 parts by mass Fine particle of urethane resin (trade name: Art-pearl C-800T, made by Negami Chemical Industrial Co., Ltd.) as fine particles for controlling roughness: 10.0 parts by mass Next, MEK was added so that a proportion of a total solid content became 25 mass %, and then the mixture was mixed by a sand mill. Next, furthermore, the viscosity was adjusted to 10 to 12 cps with MEK, and the paint for forming the electroconductive layer was prepared.

The previously produced elastic roller G-1 was immersed in the paint for forming the electroconductive layer, and a paint film of the paint was formed on the surface of the elastic layer of the elastic roller G-1, and was dried. The resultant elastic roller G-1 was further subjected to heat treatment at a temperature of 150° C. for 1 hour, and thereby the developing roller according to Example 20 was produced, which had the electroconductive layer with a film thickness of 15 μm formed on the outer circumference of the elastic layer.

<Evaluation of Developing Roller>

(Measurement of Resistance Value of Roller)

Figure 7A:
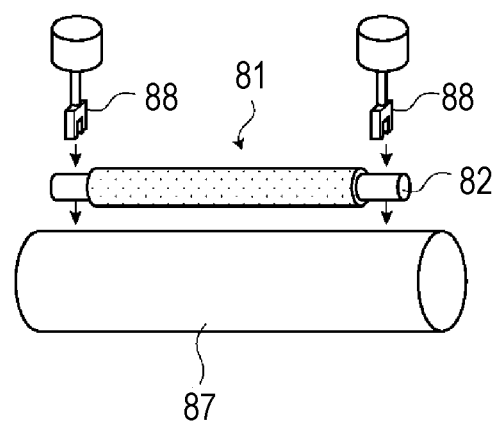
FIGS. 7A and 7B illustrate schematic views of an apparatus for measuring a current value of an electroconductive roller.
Figure 7B:
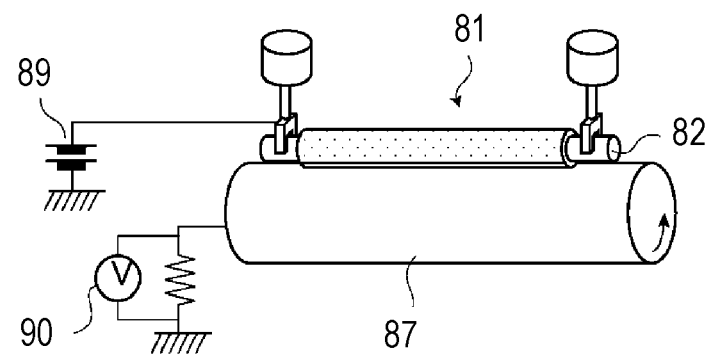

FIGS. 7A and 7B illustrate a schematic configuration view of a jig for measuring a resistance value of the roller. In FIG. 7A, a columnar metal 87 having a diameter of 30 mm is rotated, while both ends of an electroconductive shaft core body 82 are each pushed by a load of 4.9 N through electroconductive bearings 88, and thereby a developing roller 81 is driven and rotated at a speed of 60 rpm. Next, a voltage of 50 V was applied by a high voltage power supply 89, and a potential difference between both ends of the resistor was measured which was arranged between the columnar metal 87 and the ground and had a known electrical resistance (electrical resistance lower than electrical resistance of electroconductive roller by 2 digits or more). A voltmeter 90 (trade name: 189TRUE RMS MULTIMETER, made by FLUKE) was used for measuring the potential difference. An electric current which flowed to the columnar metal via the developing roller 81 was determined by a calculation based on the measured potential difference and the electrical resistance of the resistor. The electrical resistance value of the electroconductive roller was determined by dividing the applied voltage of 50 V by the obtained electric current.

Here, as for the measurement of the potential difference, the potential differences were sampled for 3 seconds after 2 seconds after voltage application, and a value calculated from the average value was determined to be the resistance value of the roller. Incidentally, the developing roller was used which was stood still in an H/H environment for 6 hours or longer, and was subjected to the measurement.

(Measurement of Taber Abrasion Loss)

A paint film of a paint for forming an electroconductive layer was produced on an aluminum sheet with a thickness of 0.2 mm, with the use of a bar coater. After that, the paint film was dried at room temperature for 30 minutes, then the dried film was subjected to heat treatment at a temperature of 150° C. for 30 minutes, and a resin layer of 30 μm was formed on the aluminum sheet. The Taber abrasion test was conducted in a similar way to that in Example 1.

(Evaluation of Toner Leakage)

There is the case where the electroconductive layer of the developing roller is abraded by rubbing between a member such as the developing blade and the developing roller. This phenomenon tends to occur at a longitudinal end of the developing roller; and as the abrasion of the electroconductive layer progresses, a regulating force of the developing blade lowers, and the toner leaks onto the developing blade in some cases. When the abrasion of the electroconductive layer has further progressed, there is the case where toner leakage occurs on the whole surface.

The toner leakage was evaluated at a temperature of 10° C. and in a humidity of 10% RH (L/L environment), in the following way. Firstly, a laser printer made by HP (trade name: HP Laser Jet Enterprise Color M553dn) was prepared. A cyan cartridge which incorporated the developing roller according to Example 20 was loaded in the evaluation machine. Cycles were repeated in which two sheets of images having a printing rate of 1% were output and the laser printer was paused for 10 seconds, and 30,000 sheets of images were output.

Incidentally, when the developer ran out, the developer was appropriately supplied, and the durability test was performed. After the images were output, the developing blade was observed, and the toner leakage was evaluated based on the following criteria.

Rank A: Toner leakage is not recognized.
Rank B: Toner leakage slightly occurs only on an end (approximately 1 cm from the end).
Rank C: Toner leakage is noticeable.

Examples 19 to 26

The developing rollers according to Examples 19 to 26 were produced in a similar way to that in Example 18, except that the ion conductive agent which was used for producing the developing roller was changed as was described in Table 20.

Comparative Examples 8 to 11

The developing rollers according to Comparative Examples 8 to 11 were produced in a similar way to that in Example 18, except that the ion conductive agent which was used for producing the developing roller was changed as was described in Table 20.

The above described developing rollers according to Examples 19 to 26 and Comparative Examples 8 to 11 were evaluated in a similar way to that in Example 18. The evaluation results are shown in Table 21.

TABLE 20

| | Ion conductive agent | | |
|---|---|---|---|
| | No. | Form at 30° C. | Added amount (parts by mass) |
| Example 18 | I-2 | Solid | 3.1 |
| Example 19 | I-5 | Solid | 3.6 |
| Example 20 | I-9 | Solid | 4.0 |
| Example 21 | I-10 | Solid | 6.0 |
| Example 22 | I-12 | Solid | 3.4 |
| Example 23 | I-13 | Solid | 2.9 |
| Example 24 | I-14 | Solid | 2.7 |
| Example 25 | I-15 | Solid | 5.1 |
| Example 26 | I-18 | Solid | 3.9 |
| Comparative example 8 | I-19 | Liquid | 2.0 |
| Comparative example 9 | I-20 | Solid | 1.3 |
| Comparative example 10 | I-22 | Liquid | 2.4 |
| Comparative example 11 | I-23 | Solid | 5.4 |

TABLE 21

| | Structure of ion conductive agent | Number of carbon atoms of functional group | | | | | Resistance value of roller (Ω) | Taber abrasion loss (mg) | Toner leakage |
|---|---|---|---|---|---|---|---|---|---|
| | | R11 R21 R31 | R12 R22 R32 | R13 R23 R33 | R14 R24 R34 | R15 R25 R35 | | | |
| Example 18 | Structural Formula (1) | 0 | 9 | 0 | 0 | 9 | 3.1E7 | 1.7 | A |
| Example 19 | Structural Formula (1) | 0 | 20 | 0 | 0 | 20 | 2.8E7 | 1.5 | A |
| Example 20 | Structural Formula (2) | 0 | 0 | 15 | 15 | 0 | 3.8E7 | 1.7 | A |
| Example 21 | Structural Formula (2) | 0 | 0 | 18 | 18 | 0 | 3.5E7 | 1.7 | A |
| Example 22 | Structural Formula (1) | 0 | 10 | 0 | 0 | 12 | 4.1E7 | 2.1 | A |
| Example 23 | Structural Formula (1) | 0 | 12 (*) | 0 | 0 | 10 | 3.3E7 | 2.4 | A |
| Example 24 | Structural Formula (1) | 0 | 18 | 0 | 0 | 9 | 4.2E7 | 2.8 | B |
| Example 25 | Structural Formula (2) | 0 | 0 | 11 | 12 | 0 | 4.3E7 | 2.1 | A |
| Example 26 | Structural Formula (2) | 0 | 0 | 8 | 19 | 0 | 4.4E7 | 2.8 | B |
| Comparative example 8 | Structural Formula (5) | 0 | 2 | 0 | 0 | 1 | 2.1E7 | 93.5 | C |
| Comparative example 9 | Structural Formula (5) | 0 | 1 | 0 | 0 | 1 | 2.2E7 | 85.2 | C |
| Comparative example 10 | Structural Formula (5) | 0 | 0 | 1 | 9 | 0 | 3.3E7 | 87.1 | C |
| Comparative example 11 | Structural Formula (5) | 0 | 0 | 2 | 27 | 0 | 3.5E7 | 85.6 | C |

(*) Number of carbon atoms in the longest hydrocarbon chain among branched hydrocarbon chains In the ion conductive agent used in Comparative Examples 8 and 9, the number of carbon atoms in each of the functional groups which are bonded to the imidazole ring is smaller than that of the structure represented by Structural Formula (1). Because of this, the entanglement between the functional group and the matrix polymer does not almost occur; and the Taber abrasion loss was as large as 80 mg or larger, and the toner leakage occurred after the durability test. In addition, in both of Comparative Example 10 that used an ion conductive agent in which the number of carbon atoms in each of the functional groups which were bonded to the imidazole ring was smaller than that of the structure represented by Structural Formula (2), and Comparative Example 11 that had a functional group having the number of carbon atoms smaller than and a functional group having the number of carbon atoms larger than that of the structure represented by Structural Formula (2), the Taber abrasion loss was large, and the toner leakage occurred.

On the other hand, in Examples 18 and 19 and Examples 22 to 24 which used the ion conductive agent having the structure represented by Structural Formula (1), the Taber abrasion loss was 3.0 mg or smaller, and the toner leakage was also slight. Similarly, in Examples 20 and 21, 25 and 26 which used the ion conductive agent having the structure represented by Structural Formula (2), the Taber abrasion loss was 3.0 mg or smaller, and the toner leakage was also slight. In Examples 18 to 23 and 25 that used an ion conductive agent in which the difference between the numbers of carbon atoms in the longest hydrocarbon chain of the saturated hydrocarbon group bonded to the position 1 and the position 3 or the position 4 and the position 5 of the imidazolium ring was 2 or less, the Taber abrasion loss was smaller, and the toner leakage did not occur. Furthermore, in Examples 18 to 22 and 25 that used an ion conductive agent in which a functional group having a linear structure represented by Structural Formula (3) or Structural Formula (4), the Taber abrasion loss showed an adequate value of 2.1 mg or smaller. In Examples 18 to 21 that used an ion conductive agent in which two functional groups bonded to the position 1 and the position 3 or the position 4 and the position 5 of the imidazolium ring were the same, the Taber abrasion loss was further reduced to be 1.7 mg or smaller, and the abrasion resistance was enhanced.

Example 27

<Production of Charging Roller>
(Production of Elastic Roller G-2)
The following materials were mixed in a pressure kneader, and an A kneaded rubber composition 1 was obtained.
NBR rubber material (trade name: Nipol DN 219, made by Zeon Corporation): 100 parts by mass
Carbon black (trade name: TOKABLACK #7360SB, made by Tokai Carbon Co., Ltd.): 40 parts by mass
Calcium carbonate (trade name: NANOX #30, made by Maruo Calcium Co., Ltd.): 20 parts by mass
Stearic acid (trade name: stearic acid S, made by Kao Corporation): 1 part by mass
Zinc oxide: 5 parts by mass
Furthermore, 166 parts by mass of the A kneaded rubber composition 1 were mixed with the following material by an open roll, and an unvulcanized rubber composition 1 was obtained.
Sulfur (trade name: Sulfax 200 S, made by Tsurumi Chemical Industry Co., Ltd.): 1.2 parts by mass
Tetrabenzylthiuram disulfide (trade name: TBZTD, made by Sanshin Chemical Industry, Co. Ltd.): 4.5 parts by mass The unvulcanized rubber composition 1 was coated on the cored bar which was made from stainless steel (SUS 304) and had a diameter of 6 mm, by a cross head extruder, an unvulcanized rubber elastic layer was provided, the unvulcanized rubber elastic layer was heated for 70 minutes in an oven which was heated to a temperature of 160° C., and the crosslinking reaction of the unvulcanized rubber elastic layer was completed. After that, the surface of the elastic layer was polished by a rotating grindstone. Thereby, an elastic roller G-2 was obtained of which the central portion diameter was 8.5 mm and of which the diameter at each position of 90 mm apart from the central portion to both end portions was 8.4 mm.

(Preparation of Paint for Forming Electroconductive Layer)
The following materials were stirred and mixed as a paint for forming the electroconductive layer.
Solvent type urethane resin (trade name: Daiferamin MAU-9022, made by Dainichiseika Color & Chemicals Co., Ltd.): 100 parts by mass Ion conductive agent I-4: 0.3 parts by mass
Silica (trade name: Aerosil 130, made by Nippon Aerosil Co., Ltd.): 0.9 parts by mass
Fine particle of urethane resin (trade name: Art-pearl C-800T, made by Negami Chemical Industrial Co., Ltd.) as fine particles for controlling roughness: 3.1 parts by mass Next, MEK was added so that the proportion of a total solid content became 25 mass %, and then the mixture was mixed by a sand mill. Next, furthermore, the viscosity was adjusted to 10 to 12 cps with MEK, and the paint for forming the electroconductive layer was prepared.

The previously produced elastic roller G-2 was immersed in the paint for forming the electroconductive layer, and a paint film of the paint was formed on the surface of the elastic layer of the elastic roller G-2, and was dried. The resultant elastic roller G-2 was further subjected to heat treatment at a temperature of 120° C. for 1 hour, and thereby the charging roller according to Example 31 was produced, which had the electroconductive layer with a film thickness of 15 μm formed on the outer circumference of the elastic layer.

<Evaluation of Charging Roller>
(Measurement of Resistance Value of Roller)
A resistance value of the roller was measured in a similar way that in Example 20.

(Measurement of Taber Abrasion Loss)
A paint film of a paint for forming an electroconductive layer was produced on an aluminum sheet with a thickness of 0.2 mm, with the use of a bar coater. After that, the paint film was dried at room temperature for 30 minutes, then the dried film was subjected to heat treatment at a temperature of 120° C. for 30 minutes, and a resin layer of 30 μm was formed on the aluminum sheet. The Taber abrasion test was performed in a similar way to that in Example 1.

(Evaluation of Void Image)
The charging roller comes in contact with the photosensitive body and rotates. Fine particles for controlling roughness by forming asperities are added to the surface layer of the charging roller, but when the surface layer has been abraded by long-term endurance running, the fine particles for controlling the roughness fall off or are scraped off in some cases. Then, surface asperities are lost and abnormal discharge tends to easily occur. Because of the abnormal discharge, an image defect occasionally occurs in which voids occur randomly, for example, when the halftone image has been output (image which draws a horizontal line having a width of 1 dot and an interval of 2 dots in the direction perpendicular to the rotation direction of the photosensitive body).

The void image was evaluated at a temperature of 10° C. and in a humidity of 10% RH (L/L environment), in the following way. Firstly, a laser printer made by HP (trade name: HP Laser Jet Enterprise Color M553dn) was prepared. A black cartridge which incorporated the charging roller according to Example 31 therein was loaded in the evaluation machine. Cycles were repeated in which two sheets of images having a printing rate of 1% were output and the laser printer was paused for 10 seconds, and 30,000 sheets of images were output. Incidentally, when the developer ran out, the developer was appropriately supplied, and the durability test was performed. After the end of the durability test, the halftone image was output, and the voids in the output image were visually checked and were evaluated according to the following criteria.

Rank A: Voids are not recognized.
Rank B: Voids occur extremely slightly.
Rank C: Voids are recognized though being slight.
Rank D: Voids are recognized.

Examples 28 to 34

The charging rollers according to Examples 28 to 34 were produced in a similar way to that in Example 27, except that the ion conductive agent which was used for producing the charging roller was changed as was described in Table 22.

Comparative Examples 12 to 15

The charging rollers according to Comparative Examples 12 to 15 were produced in a similar way to that in Example 31, except that the ion conductive agent which was used for producing the charging roller was changed as was described in Table 22.

The above described charging rollers according to Examples 28 to 34 and Comparative Examples 12 to 15 were evaluated in a similar way to that in Example 27. The evaluation results are shown in Table 23.

TABLE 22

| | Ion conductive agent | | |
|---|---|---|---|
| | No. | Form at 30° C. | Added amount (parts by mass) |
| Example 27 | I-4 | Solid | 0.4 |
| Example 28 | I-7 | Solid | 0.3 |
| Example 29 | I-8 | Solid | 0.4 |
| Example 30 | I-11 | Solid | 0.4 |
| Example 31 | I-14 | Solid | 0.3 |
| Example 32 | I-16 | Solid | 0.5 |
| Example 33 | I-17 | Solid | 0.4 |
| Example 34 | I-18 | Solid | 0.4 |
| Comparative example 12 | I-19 | Liquid | 0.2 |
| Comparative example 13 | I-21 | Solid | 0.1 |
| Comparative example 14 | I-22 | Liquid | 0.2 |
| Comparative example 15 | I-23 | Solid | 0.5 |

TABLE 23

| | Structure of ion conductive agent | Number of carbon atoms of functional group | | | | | Resistance value of roller (Ω) | Taber abrasion loss (mg) | Void image |
|---|---|---|---|---|---|---|---|---|---|
| | | $R_{11}$ $R_{21}$ $R_{31}$ | $R_{12}$ $R_{22}$ $R_{32}$ | $R_{13}$ $R_{23}$ $R_{33}$ | $R_{14}$ $R_{24}$ $R_{34}$ | $R_{15}$ $R_{25}$ $R_{35}$ | | | |
| Example 27 | Structural Formula (1) | 0 | 12 | 0 | 0 | 12 | 4.4E6 | 2.1 | A |
| Example 28 | Structural Formula (2) | 0 | 1 | 11 | 11 | 1 | 5.1E6 | 2.0 | A |
| Example 29 | Structural Formula (2) | 1 | 0 | 11 | 11 | 0 | 5.0E6 | 1.9 | A |

TABLE 23-continued

|  | Structure of ion conductive agent | R11 R21 R31 | R12 R22 R32 | R13 R23 R33 | R14 R24 R34 | R15 R25 R35 | Resistance value of roller (Ω) | Taber abrasion loss (mg) | Void image |
|---|---|---|---|---|---|---|---|---|---|
| Example 30 | Structural Formula (1) | 0 | 13 | 0 | 0 | 12 | 4.2E6 | 2.3 | A |
| Example 31 | Structural Formula (1) | 0 | 18 | 0 | 0 | 9 | 4.1E6 | 3.1 | B |
| Example 32 | Structural Formula (2) | 0 | 0 | 8 | 10 | 0 | 5.3E6 | 2.3 | A |
| Example 33 | Structural Formula (2) | 0 | 0 | 10 | 11 (*) | 0 | 5.5E6 | 2.7 | A |
| Example 34 | Structural Formula (2) | 0 | 0 | 8 | 19 | 0 | 5.5E6 | 3.0 | B |
| Comparative example 12 | Structural Formula (5) | 0 | 2 | 0 | 0 | 1 | 3.9E6 | 101.3 | D |
| Comparative example 13 | Structural Formula (5) | 0 | 21 | 0 | 0 | 21 | 5.5E6 | 89.3 | D |
| Comparative example 14 | Structural Formula (5) | 0 | 0 | 1 | 9 | 0 | 5.7E6 | 99.5 | D |
| Comparative example 15 | Structural Formula (5) | 0 | 0 | 2 | 27 | 0 | 6.8E6 | 91.4 | D |

(*) Number of carbon atoms in the longest hydrocarbon chain among branched hydrocarbon chains In the ion conductive agent used in Comparative Example 12, the number of carbon atoms in each of the functional groups which are bonded to the imidazole ring is smaller than that of the structure represented by Structural Formula (1). Because of this, the entanglement between the functional group and the matrix polymer did not almost occur; and the Taber abrasion loss became as large as 100 mg or larger, and the void image occurred after the durability test. In the ion conductive agent used in Comparative Example 13, the number of carbon atoms in each of the functional groups which are bonded to the imidazole ring is larger than that of the structure represented by Structural Formula (1), and the excluding volume is large. Because of this, the entanglement between the functional group and the matrix polymer resisted occurring; and the Taber abrasion loss became large, and the void image occurred after the durability test.

In the ion conductive agent used in Comparative Example 14, the number of carbon atoms in each of the functional groups which are bonded to the imidazole ring is smaller than that of the structure represented by Structural Formula (2). Because of this, the Taber abrasion loss became large as in Comparative Example 12, and the void image occurred after the durability test. The ion conductive agent used in Comparative Example 15 has one functional group having a smaller number of carbon atoms of the functional group bonded to the imidazole ring than and a larger number of carbon atoms thereof than the structure represented by Structural Formula (2). Because of this, the effect of enhancing the abrasion resistance could not be obtained, the Taber abrasion loss became large, and the void image occurred after the durability test.

On the other hand, in Examples 27, 30 and 31 that used the ion conductive agent having the structure represented by Structural Formula (1), the entanglement between the ion conductive agent and the matrix polymer occurred, and the pseudo-crosslinking points increased; and accordingly the Taber abrasion loss showed an adequate value of 3.5 mg or smaller. Also in Examples 28, 29, and 32 to 334 which used the ion conductive agent having the structure represented by Structural Formula (2), the Taber abrasion loss showed an adequate value of 3.5 mg or smaller. In Examples 27 to 30, 32 and 33 that used an ion conductive agent in which the difference between the numbers of carbon atoms in the longest hydrocarbon chain of the saturated hydrocarbon group bonded to the position 1 and the position 3 or the position 4 and the position 5 of the imidazolium ring was 2 or less, the Taber abrasion loss was smaller, and the void image did not occur. Furthermore, in Examples 27 to 30 and 32 that used an ion conductive agent in which a functional group having a linear structure represented by Structural Formula (3) or Structural Formula (4), the Taber abrasion loss showed an adequate value of 2.5 mg or smaller. In Examples 27 to 29 that used an ion conductive agent in which two functional groups bonded to an imidazolium ring were the same, the Taber abrasion loss was further reduced to 2.1 mg or smaller, and the abrasion resistance was enhanced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-144210, filed Jul. 31, 2018, which is hereby incorporated by reference herein in its entirety.

What is claimed is:
1. An electrophotographic member, comprising:
an electroconductive substrate; and
an electroconductive layer on the substrate, the electroconductive layer comprising a matrix polymer and an imidazolium salt represented by Formula (1) or Formula (2)

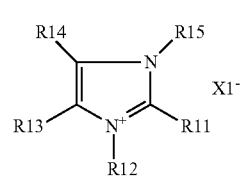

(1)

where R11, R13 and R14 independently represent a hydrogen atom or a saturated hydrocarbon group having 1 to 4 carbon atoms, R12 and R15 independently represent a saturated hydrocarbon group having 8 to 20 carbon atoms, and X1⁻ represents an anion, provided that at least one of R12 and R15 represents a saturated hydrocarbon group having 9 to 20 carbon atoms;

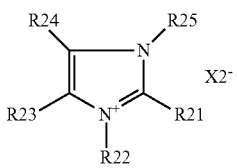

where R21, R22 and R25 independently represent a hydrogen atom or a saturated hydrocarbon group having 1 to 4 carbon atoms, R23 and R24 independently represent a saturated hydrocarbon group having 8 to 20 carbon atoms, and $X2^-$ represents an anion, provided that at least one of R23 and R24 represents a saturated hydrocarbon group having 9 to 20 carbon atoms.

2. The electrophotographic member according to claim 1, wherein a difference between the number of carbon atoms in R12 and the number of carbon atoms in R15 is 0 to 2.

3. The electrophotographic member according to claim 1, wherein R12 and R15 are independently represented by Formula (3)

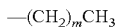

where m represents an integer of 8 to 19.

4. The electrophotographic member according to claim 1, wherein R12 and R15 are the same.

5. The electrophotographic member according to claim 1, wherein a difference between the number of carbon atoms in R23 and the number of carbon atoms in R24 is 0 to 2.

6. The electrophotographic member according to claim 1, wherein R23 and R24 are independently represented by Formula (4)

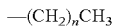

where n represents an integer of 8 to 19.

7. The electrophotographic member according to claim 1, wherein R23 and R24 are the same.

8. The electrophotographic member according to claim 1, wherein the matrix polymer comprises at least one resin selected from the group consisting of a polyamide resin, a polyurethane resin, a polyester resin and an acrylic resin.

9. The electrophotographic member according to claim 1, wherein the anion is at least one member selected from the group consisting of a fluoroalkylsulfonylimide anion, a fluorosulfonylimide anion, a fluoroalkyl sulfonate anion, a fluoroalkyl carboxylate anion, a fluoroborate anion, a dicyanamide anion, a bisoxalatoborate anion, a thiocyanate anion, a fluorophosphate anion and a fluoroalkyl methide anion.

10. The electrophotographic member according to claim 1, wherein the anion is at least one member selected from the group consisting of bis(trifluoromethanesulfonyl)imide anion, a bis(pentafluoroethanesulfonyl)imide anion, a bis(heptafluoropropanesulfonyl)imide anion, a bis(nonafluorobutanesulfonyl)imide anion, a bis(dodecafluoropentanesulfonyl)imide anion, a bis(perfluorohexanesulfonylimide) anion, an N,N-hexafluoropropane-1,3-disulfonylimide anion, a bis(fluorosulfonyl)imide anion, a trifluoromethanesulfonic acid anion, a perfluoroethanesulfonic acid anion and a perfluorobutanesulfonic acid anion.

11. A process cartridge configured to be detachably attached to a main body of an electrophotographic image forming apparatus, said process cartridge comprising an electrophotographic member and at least one member selected from the group consisting of a charging member, a developing member and a cleaning member;

the electrophotographic member comprising an electroconductive substrate with an electroconductive layer on the substrate, wherein the electroconductive layer comprises a matrix polymer and an imidazolium salt represented by Formula (1) or Formula (2)

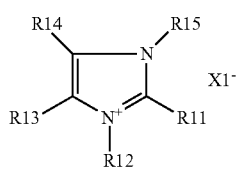

where R11, R13 and R14 independently represent a hydrogen atom or a saturated hydrocarbon group having 1 to 4 carbon atoms, R12 and R15 independently represent a saturated hydrocarbon group having 8 to 20 carbon atoms, and $X1^-$ represents an anion, provided that at least one of R12 and R15 represents a saturated hydrocarbon group having 9 to 20 carbon atoms;

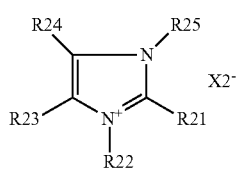

where R21, R22 and R25 independently represent a hydrogen atom or a saturated hydrocarbon group having 1 to 4 carbon atoms, R23 and R24 independently represent a saturated hydrocarbon group having 8 to 20 carbon atoms, and $X2^-$ represents an anion, provided that at least one of R23 and R24 represents a saturated hydrocarbon group having 9 to 20 carbon atoms.

12. An electrophotographic image forming apparatus, comprising an electrophotographic member and at least one member selected from the group consisting of a charging member, a developing member and a cleaning member;

the electrophotographic member comprising an electroconductive substrate and an electroconductive layer on the substrate, wherein the electroconductive layer comprises a matrix polymer and an imidazolium salt represented by Formula (1) or Formula (2)

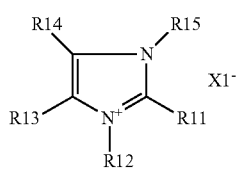

where R11, R13 and R14 independently represent a hydrogen atom or a saturated hydrocarbon group having 1 to 4 carbon atoms, and R12 and R15 independently represent a saturated hydrocarbon group having 8 to 20 carbon atoms, and X1⁻ represents an anion, provided that at least one of R12 and R15 represents a saturated hydrocarbon group having 9 to 20 carbon atoms;

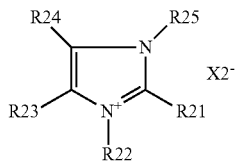

(2)

where R21, R22 and R25 independently represent a hydrogen atom or a saturated hydrocarbon group having 1 to 4 carbon atoms, R23 and R24 independently represent a saturated hydrocarbon group having 8 to 20 carbon atoms, and X2⁻ represents an anion, provided that at least one of R23 and R24 represents a saturated hydrocarbon group having 9 to 20 carbon atoms.

13. The electrophotographic member according to claim 1, wherein the saturated hydrocarbon group having 9 to 20 carbon atoms is a linear saturated hydrocarbon group.

14. The electrophotographic member according to claim 1, wherein the saturated hydrocarbon group having 9 to 20 carbon atoms is a nonyl group, a decyl group, an undecyl group, a dodecyl group, a tridecyl group, a tetradecyl group, a pentadecyl group, a hexadecyl group, a heptadecyl group, an octadecyl group, a nonadecyl group or an icosyl group.

15. The electrophotographic member according to claim 1, wherein the electroconductive layer is an outermost layer of the electrophotographic member.

* * * * *